US007028223B1

(12) United States Patent
Kolawa et al.

(10) Patent No.: US 7,028,223 B1
(45) Date of Patent: Apr. 11, 2006

(54) SYSTEM AND METHOD FOR TESTING OF WEB SERVICES

(75) Inventors: Adam Kolawa, Bradbury, CA (US); James Edmond Clune, III, Glendora, CA (US); Wendell T. Hicken, La Verne, CA (US); Luke Li-Ming Chen, Cerritos, CA (US)

(73) Assignee: Parasoft Corporation, Monrovia, CA (US)

(*) Notice: Subject to any disclaimer, the term of this patent is extended or adjusted under 35 U.S.C. 154(b) by 598 days.

(21) Appl. No.: 10/214,209

(22) Filed: Aug. 7, 2002

Related U.S. Application Data

(60) Provisional application No. 60/312,010, filed on Aug. 13, 2001.

(51) Int. Cl.
*G06F 11/00* (2006.01)
(52) U.S. Cl. .......................... 714/38; 714/37
(58) Field of Classification Search ............ 714/37, 714/38
See application file for complete search history.

(56) References Cited

U.S. PATENT DOCUMENTS

| | | | | |
|---|---|---|---|---|
| 5,490,249 | A * | 2/1996 | Miller .................... | 714/38 |
| 5,758,062 | A * | 5/1998 | McMahon et al. ........ | 714/38 |
| 6,002,871 | A * | 12/1999 | Duggan et al. ........... | 717/135 |
| 6,446,120 | B1 * | 9/2002 | Dantressangle .......... | 709/224 |
| 6,505,342 | B1 * | 1/2003 | Hartmann et al. ....... | 717/104 |
| 6,622,298 | B1 * | 9/2003 | Stamm .................... | 717/125 |
| 6,675,355 | B1 * | 1/2004 | Demopoulos et al. ..... | 715/513 |
| 6,823,281 | B1 * | 11/2004 | Friedman et al. ......... | 702/119 |
| 2002/0120685 | A1 * | 8/2002 | Srivastava et al. ........ | 709/203 |
| 2002/0133752 | A1 * | 9/2002 | Hand ...................... | 714/38 |
| 2002/0184610 | A1 * | 12/2002 | Chong et al. ............. | 717/109 |
| 2003/0033369 | A1 * | 2/2003 | Bernhard ................ | 709/203 |
| 2004/0015865 | A1 * | 1/2004 | Cirone et al. ............ | 717/124 |

OTHER PUBLICATIONS

Bastide et al., "Formal Specification of CORBA Services: Experience and Lessons Learned.", 2000, ACM.*
Yang et al., "An Object-Oriented Architecture Supporting Web Application Testing", 1999, IEEE.*
Liu et al., "Structural Testing of Web Applications", 2000, IEEE.*

* cited by examiner

*Primary Examiner*—Scott Baderman
*Assistant Examiner*—Gabriel Chu
(74) *Attorney, Agent, or Firm*—Christie, Parker & Hale, LLP

(57) ABSTRACT

The present invention is a module testing tool for Web services. In one embodiment, the present invention automates the testing of Web services that use SOAP as a wire protocol and HTTP as a transport protocol. The invention provides an easy interface for exercising Web services and testing their functionality. The invention helps users confirm the responses to SOAP messages with such features as fault detection, textual comparisons, XML validation by DTDs or XML Schemas, and the ability to express and flag complex patterns in XML. The invention lets the users validate responses that require application-specific verification (such as business logic validation) by plugging in their own code. It also provides the capability to perform regression testing of web services. The invention can automatically creates regression test controls from SOAP Client responses, or users can create their own regression tests.

18 Claims, 25 Drawing Sheets

FIG. 6C

Tree View, by Error

```
All Messages (8)
  C:\Program Files\ParaSoft\XMLWorkbench\Examples (4)
    example2_1.xml (1)
      Stopping after fatal error. The element type "EXAMPLE2" must be terminated by the matching end-tag "</EXAMPLE2>"
    example3_1.xml (1)
      Stopping after fatal error. The value of attribute "temp" must begin with either a single or double quote character.
    sales01_1.xml (1)
      Stopping after fatal error. The element type "division" must be terminated by the matching end-tag "</division>"
    sales02_2.xml (1)
      Stopping after fatal error. The element type "revenue" must be terminated by the matching end-tag "</revenue>"
  C:\Program Files\ParaSoft\XMLWorkbench\Examples\example2_1.xml (1)
    Line 13: The element type "EXAMPLE2" must be terminated by the matching end-tag "</EXAMPLE2>"
  C:\Program Files\ParaSoft\XMLWorkbench\Examples\example3_1.xml (1)
    Line 18: The value of attribute "temp" must begin with either a single or double quote character.
  C:\Program Files\ParaSoft\XMLWorkbench\Examples\sales01_1.xml (1)
    Line 6: The element type "division" must be terminated by the matching end-tag "</division>"
  C:\Program Files\ParaSoft\XMLWorkbench\Examples\sales02_2.xml (1)
    Line 9: The element type "revenue" must be terminated by the matching end-tag "</revenue>"
```

Tree View, by Location

FIG. 7B

| File | Line | Error |
|---|---|---|
| \example2_1.xml | | Stopping after fatal error The element type "EXAMPLE2" must be terminated by the matching end-tag "</EXAMPLE2>" |
| \example3_1.xml | | Stopping after fatal error The value of attribute "temp" must begin with either a single or double quote character |
| \sales01_1.xml | | Stopping after fatal error The element type "division" must be terminated by the matching end-tag "</division>" |
| \sales02_2.xml | | Stopping after fatal error The element type "revenue" must be terminated by the matching end-tag "</revenue>" |
| C:\Program Files\ParaSoft\XMLWor | 13 | The element type "EXAMPLE2" must be terminated by the matching end-tag "=/EXAMPLE2>" |
| C:\Program Files\ParaSoft\XMLWor | 18 | The value of attribute "temp" must begin with either a single or double quote character |
| C:\Program Files\ParaSoft\XMLWor | 6 | The element type "division" must be terminated by the matching end-tag "</division>" |
| C:\Program Files\ParaSoft\XMLWor | 9 | The element type "revenue" must be terminated by the matching end-tag "</revenue>" |

Table View

FIG. 7C

SYSTEM AND METHOD FOR TESTING OF WEB SERVICES

CROSS-REFERENCE TO RELATED APPLICATION

This patent application claims the benefit of the filing date of U.S. Provisional Patent Application Ser. No. 60/312,010, filed Aug. 13, 2001 and entitled "MODULE TESTER FOR WEB SERVICES", the entire content of which is hereby expressly incorporated by reference.

FIELD OF THE INVENTION

The present invention relates to a method and system for testing computer software. More specifically, the present invention is directed to a method and system for module testing of Web Service protocols.

BACKGROUND OF THE INVENTION

The problem of writing error-free computer programs has plagued programmers since the very beginning. Sophisticated schemes for automatically discovering program errors and bugs of all kinds, including lexical, syntactic, semantic and logical, have been developed. However, these schemes have generally been directed to enforcing adherence to concrete programming standards inherent in the definition of the programming language itself and not to more extrinsic quality-related concerns, such as language modularity, portability, testing costs and communications between different program modules in networked and distributed environments.

Web service is a term that has emerged to describe a software module deployed on the Web and intended for use as a component of one or more applications distributed across the Internet. A Web service inherently exists as part of a larger system. It is the servicing of these other components that gives Web services their name. Thus, a primary consideration in the design of a Web service is the protocols that will be used to communicate with other components of the system.

The first relevant protocol is the transport layer, which is typically HTTP or HTTPS. Other transport protocols, such as Java's Remote Method Invocation (RMI), CORBA's Internet Inter-Orb Protocol (IIPO), or DCOM's Distributed Computing Environment Remote Procedure Call (DCE RPC) can enable distributed applications, but such applications are not considered Web services because they are not deployed on the Web.

A second relevant protocol is the packaging layer. This layer defines how content is wrapped up into messages that are sent over the transport layer. The emerging standard in this area is called SOAP. SOAP, originally stood for "Simple Object Access Protocol", but it now refers to a more generalized protocol for any service oriented protocol. SOAP is currently an XML-based messaging framework for exchanging structured and typed information between peers in a decentralized, distributed environment. Extensible Markup Language (XML) is a meta-markup language for describing data objects. The specifications defining both SOAP and XML are produced by the World Wide Web Consortium (W3C). SOAP is typically implemented in XML and relies on XML namespaces and XML schemas to define document types that describe messages. SOAP describes a simple messaging (request/response) mechanism (for example, Remote Procedure Calls (RPC)). That is, a SOAP client sends a request (e.g., a RPC request) to a SOAP server. The SOAP server then replies by sending a response (e.g., a RPC response) to the SOAP client.

Web Services Description Language (WSDL), also typically implemented in XML, is used to describe the types of requests accepted by a particular Web service. It is used to communicate meta-information about the Web service and, as such, is not strictly necessary for invoking the Web service itself.

Since XML is a meta-markup language, it provides mechanisms for defining languages that are implemented in XML. There are two basic mechanisms for defining these languages: Document Type Definition (DTD) and XML Schema. DTDs provide mechanisms for expressing which elements are allowed and what the composition of each element can be. Allowable attributes can be defined per element type, and allowable attribute values can be defined per attribute. However, DTDs have some shortcomings. They do not provide the capability to extend types, they do not have provisions for namespaces, and competency in DTD writing requires learning a syntax that seems obscure to those outside the SGML world. To address these issues, XML schemas were introduced. Like DTDs, schemas define a set of authorized elements, attributes, and attribute values. However, schemas are namespace-aware and are more type-oriented than DTDs. Also, schemas themselves are an XML-based language, so learning schemas does not require learning a new syntax.

The development of high quality web services requires testing at multiple levels. This is a difficult and time consuming task, both to exercise the web services and to confirm that the messages conform to requirements regarding features such as well-formedness, validity, fault handling, and application-specific business logic. Therefore, there is a need to a system and method to automate testing of SOAP-based Web services.

SUMMARY OF THE INVENTION

Accordingly, the present invention enables the above problems to be overcome by providing a method and system for automating the testing of Web services that use SOAP as a wire protocol. The invention provides an easy interface for exercising Web services and testing their functionality. The invention helps users confirm the responses to SOAP messages with such features as fault detection, textual comparisons, XML validation by DTDs or XML Schemas, and the ability to express and flag complex patterns in XML. The invention lets the users validate responses that require application-specific verification (such as business logic validation) by plugging in their own code. The invention also provides the capability to perform regression testing of web services. In one embodiment, the invention automatically creates regression test controls from SOAP responses. Alternatively, users can create their own regression tests. In one embodiment, for testing XML, the invention includes a built-in Extensible Style Sheet Language Transformation (XSLT) processor, XML parser, and an editor.

In one aspect the invention is directed to a method for automatic testing of a web service software including SOAP comprising: identifying the web service; creating one or more test cases for exercising behavior of the identified web service; executing the created one or more test cases for obtaining results for the behavior of the identified web service; and analyzing the results. In another aspect, the invention is directed to a method for automatic testing of a SOAP client comprising: identifying a web service interface to the client; creating behavior of the identified interface; exercising the client to invoke the web service and for obtaining results for the behavior of the identified interface; and analyzing the results.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIGS. 6A–6C are exemplary GUI screens for executing the tests and displaying the results, according to one embodiment of the present invention;

FIGS. 7A–7C are exemplary GUI screens for different error views, according to one embodiment of the present invention;

DETAILED DESCRIPTION

The present invention is a module testing tool for Web services. In one embodiment, the present invention automates the testing of Web services that use SOAP as a wire protocol and a transport protocol such as Standard Mail Transfer Protocol (SMTP), Hypertext Transfer Protocol (HTTP), HTTP over Secure Socket Layer (HTTPS), and the like. The invention provides an easy interface for exercising Web services, performing black box testing, and testing SOAP clients. In addition, the invention can be used to confirm the responses to SOAP messages with features such as fault detection, textual comparisons, XML validation by DTDs or XML schemas. Responses requiring application-specific verification such as business logic validation are supported through scripting. The invention also performs regression testing of Web services, including automatic creation of regression test controls from SOAP responses. In the case of XML, one embodiment of the invention includes a built-in XSLT processor, XML parser, and editor.

Figure 1A:
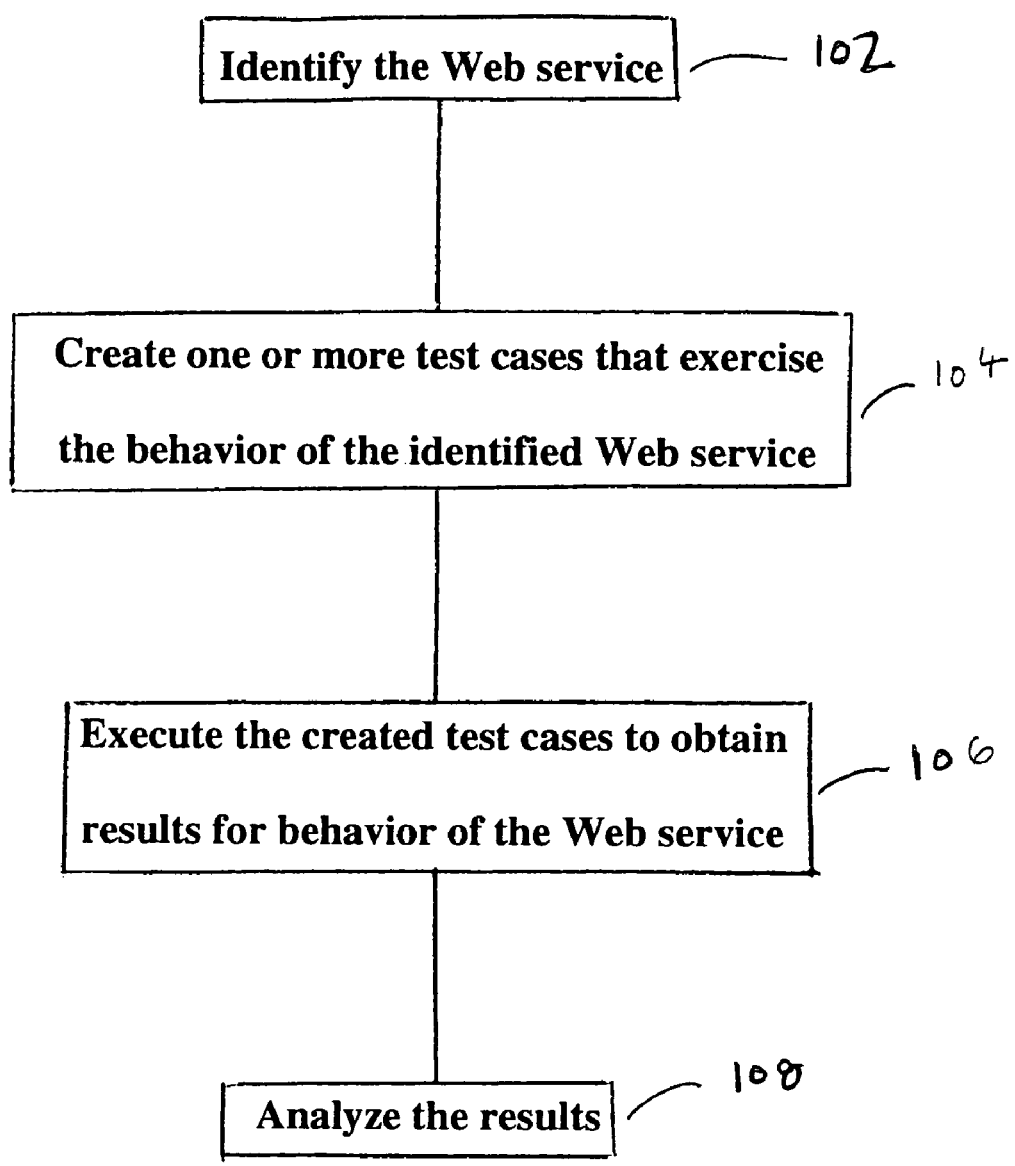
FIG. 1A is an exemplary simplified flow diagram of a testing process, according to one embodiment of the present invention.

FIG. 1A is an exemplary simplified flow diagram of a testing process, according to one embodiment of the present invention. In step 102, the Web service to be tested is identified. For example, a WSDL file, a Universal Description Discover and Integration (UDDI) file, or some other metadata about the Web service describing, for instance, what protocols are being used and how to interact with the Web service, may be identified in this step. One or more test cases that exercise the behavior of the identified Web service are created, as depicted in step 104. In one embodiment, this step includes identifying methods and parameter types associated with the Web service, generating instances for the identified methods and parameter types, asserting properties about the response based on metadata in the Web service, and storing the above steps as a reusable test case. The created test cases are executed to obtain results for behavior of the Web service in step 106. In step 108, the results are analyzed, for example, conformance to the specification is validated.

In one embodiment, the invention is capable of automatic creation of GUI elements to input custom, complex data types. This means that when a custom, complex data type is specified in a WSDL document, the invention generates controls for the specific elements which make up the data type in order to allow the user to easily specify complex parameters. The invention creates an internal representation of the metadata for the Web service, which includes information such as the service name, number of parameters, parameter types, and return type, which is incorporated into the generated test case. From this internal representation, the invention produces a graphical user interface representation that visually represents a test case. This visual representation of the test case enables users to both analyze and manipulate the test cases directly. The parameter instance generation and manipulation are not limited to the GUI, but the presence of the GUI facilitates this work in the cases where it is most helpful. This is particularly true when very complex types are used and users may want to directly express specific instances of the complex parameters so as to exercise known portions of the Web service implementation.

The GUI representation is a composite of complex and primitive components. The primitive components are based on a mapping of primitive XML types to primitive GUI components. For example, strings are represented with text boxes, boolean values are represented with check-boxes, arrays are represented with tables, enumerations are represented with combo boxes. The primitive XML types are mapped to primitive GUI components. This mapping enables arbitrarily complex data types to be represented in the GUI by decomposing the data types into their constituent primitive types, translating these constituent parts into their corresponding GUI components, and composing a complex GUI component that parallels the composition of the original data types. An exemplary process is depicted below a) Break complex data types into primitive data types including the relationships of how the primitive data types are composed into the complex data type, b) Replace the primitive data types with their corresponding primitive GUI elements based on a predefined mapping, and c) Compose the GUI elements into a composite GUI element based on the relationships found in the original complex type composition.

In addition to working as a client to test Web services, the invention can be used as a server to test clients. When the invention is used in this way, it serves as a platform on which Web services are deployed. A good reason for deploying a service in the invention is that the same verification tools used to test SOAP responses can be used to verify SOAP requests.

As an example, consider the manipulation of items in a shopping cart in an Online Grocer application. Normally, the shopping cart would be manipulated via the Web interface. However, manipulating the application programmatically might also be desirable. For instance, say that the Online Grocer forges a partnership with another online service and that other service wants to purchase items for their customers. This is a business opportunity for the Online Grocer to gain some extra purchases from its partner's customers. It is also a business opportunity for the partner if the Online Grocer provides a commission for each purchase that comes through this means. However, this type of tight integration requires that the partner be able to place orders programmatically. Services required could include:

addItemToCart( ): Adds a specified item to a specified cart
disposeCart( ): Deletes a specified cart
getCartItems( ): Returns the items in a specified cart
getCartTotal( ): Returns the total cost for a specified cart
getCartsByUserId( ): Returns all carts for a specified user
getNewCart( ): Creates a new cart for a specified user
purchaseCart( ): Purchases a specified cart Deploying these services in this embodiment of the invention is simple. First, we choose View>Show Web Services. A Web Services tab appears in the left window of the GUI. We select the Web Services root node within the Web Services tab and set the port number to the port on which we want to publish these services. Now, we can add services and define methods for SOAP RPC calls.

For example, to add the getCartTotal ( ) service, we right-click the main Web Services node and select Add Output>Web Service. A node labeled undefined method is added to the Web Services tree. After we select the new service by clicking it, a method parameters panel appears in the right frame of the GUI. Here we can determine how the invention unmarshalls parameters and marshalls return values. If we select Automatically, the invention will unmarshall parameters and marshall return values for us. In this case, the function signature should exactly match the RPC method that will be requested. If we select Manually, we ourselves can unmarshall the parameters and marshall the return values. We choose the automatic marshalling option here for simplicity. Methods in the invention may be implemented in Java, Python, or JavaScript. A simple implementation of the getCartTotal( ) method in Python looks like:

defgetCartTotal(cart_id):
    return 12345

The input parameter cart_id is ignored, and the constant total of $123.45 is hardcoded.

In one embodiment, the invention is capable of Web Service deployment in multiple languages including: Java, JavaScript, Jython (Java-based Python), Jacl, Jscheme, and the like. These multiple languages include native services as well. In this case, the invention behaves as a server in order to test the client. In this embodiment, a variety of implementation languages are supported, where the user specifies both which implementation language they are using as well as what actual implementation to use, which is specified in their language of choice. Alternatively, the user can specify the implementation language, but allow the invention to generate an implementation that conforms to a specified interface. These methods are not mutually exclusive because an implementation that is automatically generated may then be modified by the user. Examples of implementation languages that the user may specify include Java, Javascript, Python, and the like.

Figure 1B:
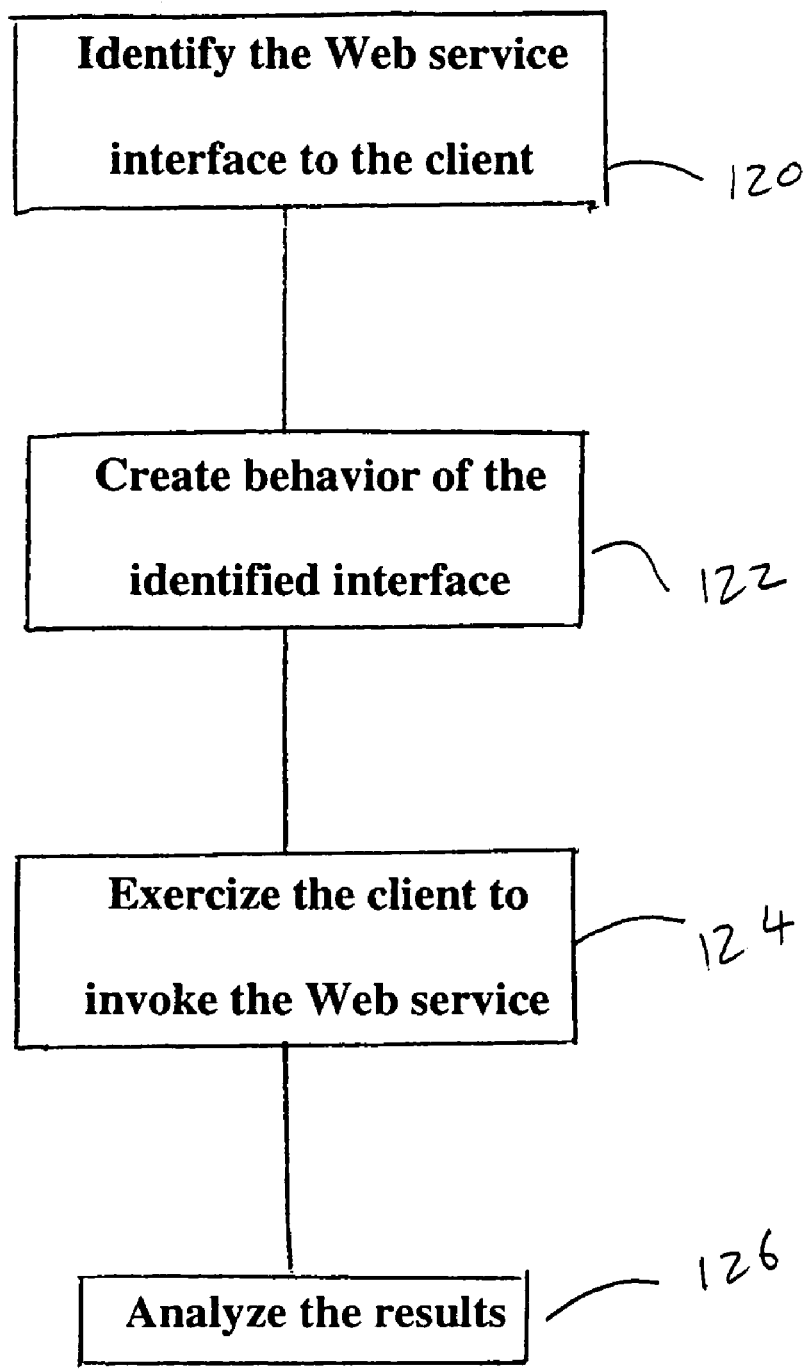
FIG. 1B is an exemplary simplified flow diagram of a testing process, according to one embodiment of the present invention in which the invention behaves as a SOAP server.

FIG. 1B is an exemplary simplified flow diagram of a testing process, according to one embodiment of the present invention in which the invention behaves as a SOAP server in order to test a SOAP client. In step 120, the Web service interface to the client is identified. Similar to step 102 of FIG. 1A, a WSDL file, a Universal Description Discover and Integration (UDDI) file, or some other metadata about the Web service describing, for example, what protocols are being used and how to interact with the Web service, may be identified in this step. The behavior of the identified interface is implemented in step 122. One way to do this is to implement assertions about requests from the client. The client is then exercised to invoke the Web service in step 124. In other words, the client is pointed to the created (predicted) behavior to obtain results about the behavior of the client. In step 126, the results are analyzed similar to step 108 of FIG. 1A.

In one embodiment, the invention includes the ability to check response time of Web Services. The invention is also capable of load testing for Web services. It provides a flexible infrastructure that lets users create and run a wide variety of tests on their Web services. This can be done in multiple ways. An assertion that the response time must be within a certain range can be expressed in the test case itself. It can also be deferred to a post-execution analysis phase. In either case, a timer is used to determine the total time from the time the request message is sent to the time the response message is received. This information can then be correlated with other data to disambiguate network traffic time from server processing time. One such scheme is for the invention to simply periodically ping the server to acquire an estimate of the network travel time. Another scheme is for the invention to communicate with monitors on the server to deduce a finer grained picture of how much time is spent in each component. Another sub-item here is to record how the response time changes as the server is placed under load, and to create a report of this for further analysis.

In one embodiment, the invention contains a library of tools that can be used as primary testing tools and/or as tools that perform operations on the output of other tests. By combining and chaining the available tools, complex and specific tests can be created.

The first step in testing a Web service with the present invention is to create a test suite. The test suite defines all the tests needed to perform on the service. A Graphical User Interface (GUI) includes a Test menu containing the option Create Test Suite. Selecting this option causes a tree-view graphical representation of the new test suite to appear on the left side of the GUI. Right-clicking the test suite node provides a menu for adding tests to the test suite. Each test has an associated tool and an associated input. Examples of some available tools include SOAP Client, XSLT, Validate XML, RuleEnforcer, and so on.

Figure 2:
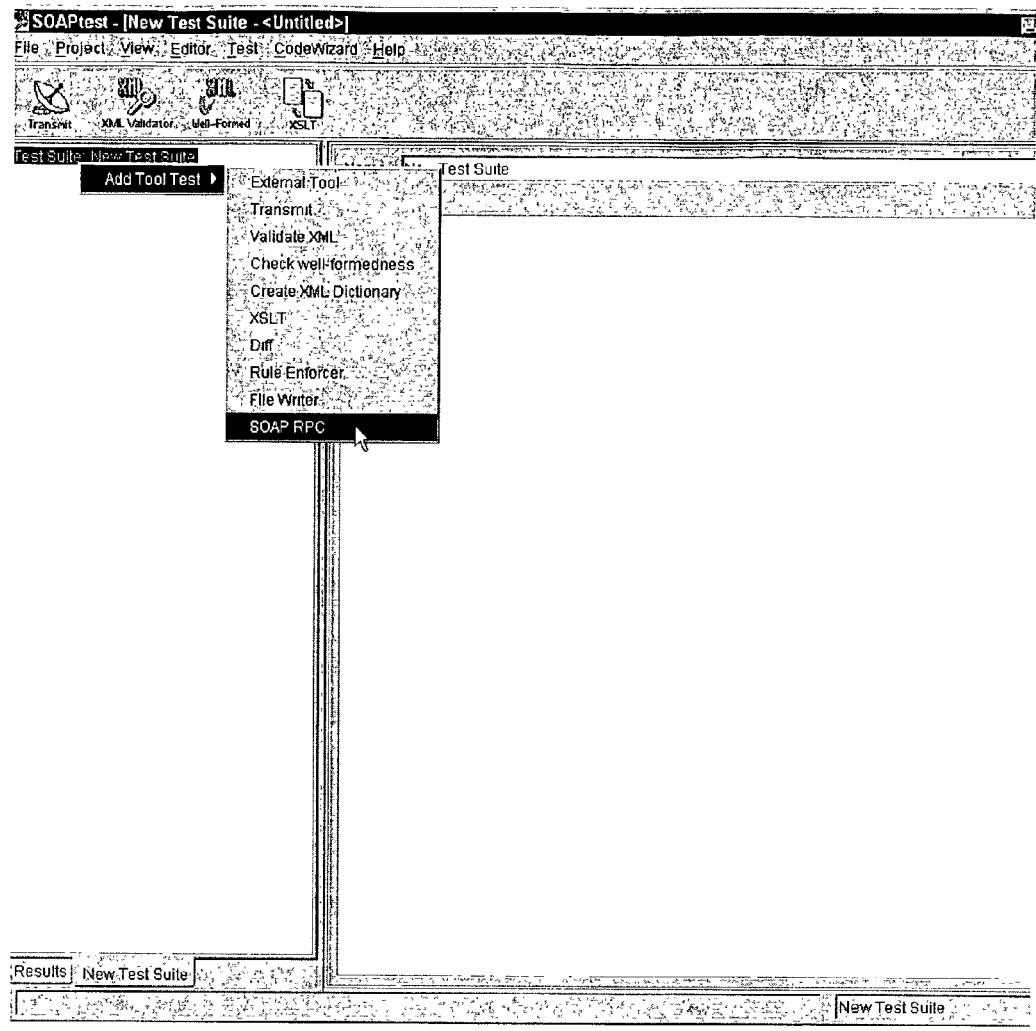
FIG. 2 is an exemplary graphical user interface (GUI) screen, according to one embodiment of the present invention.
Figure 3:
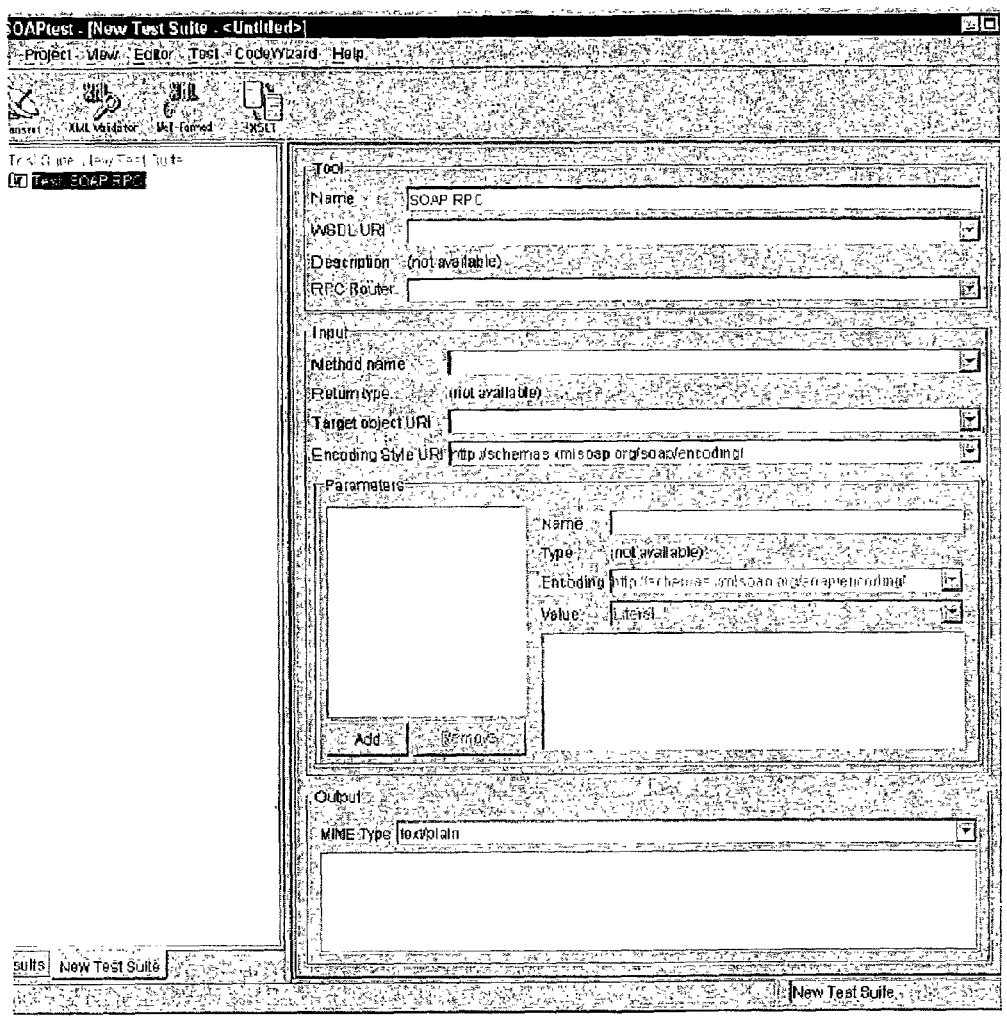
FIG. 3 is an exemplary GUI screen for specifying test parameters, according to one embodiment of the present invention.
Figure 4:
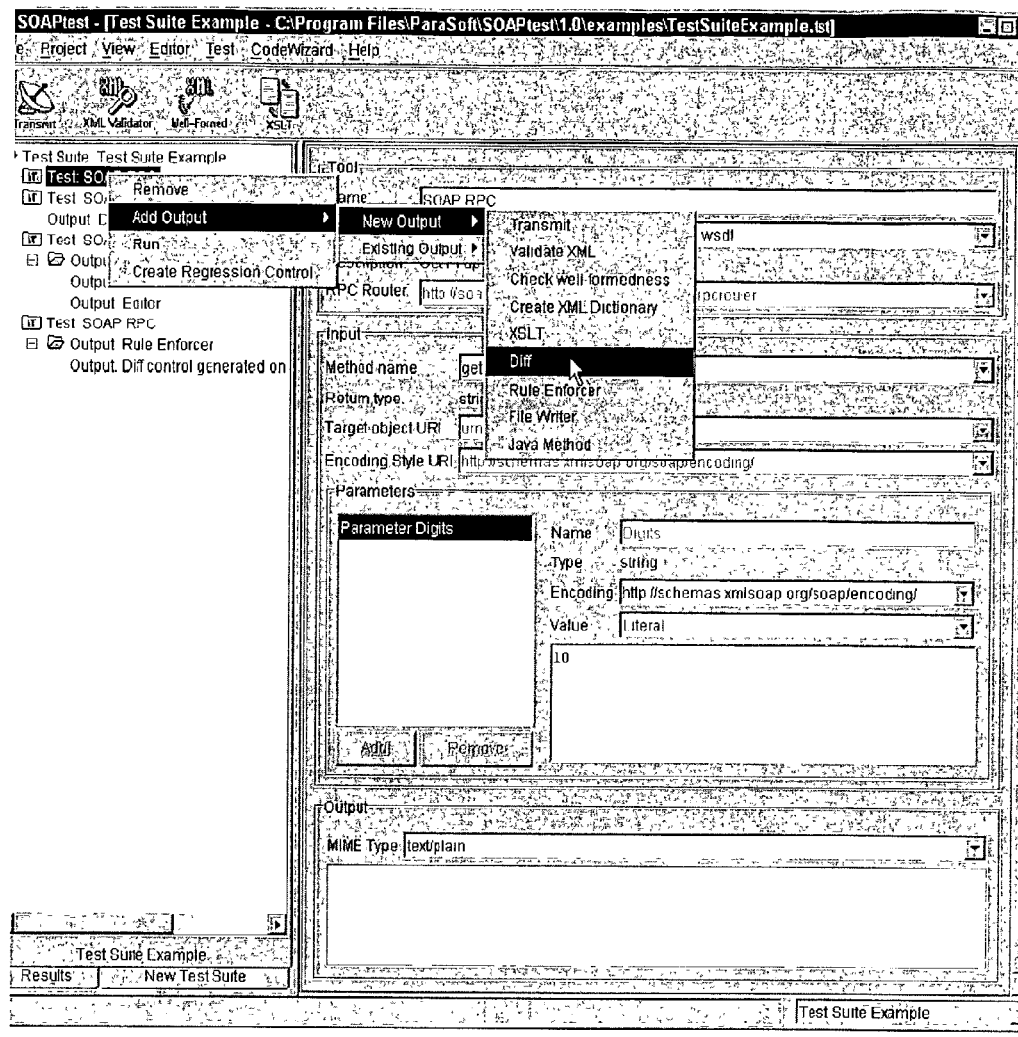
FIG. 4 is an exemplary GUI screen for specifying one or more output for a selected tool parameters, according to one embodiment of the present invention.
Figure 5:
FIG. 5 is an exemplary GUI screen for specifying test parameters for a selected tool parameters, according to one embodiment of the present invention.

The following is a typical process for creating a test suite.
  a) Create a new test suite by choosing Test>Create Test Suite. A tab named New Test Suite will be added to the left side of the GUI, as shown in FIG. 2. This is the tab where a new test suite will be constructed and controlled.

b) (Optional) If you want to name your test suite something other than "New Test Suite," enter the new test suite name in the Name field on the top of the right GUI panel.
c) Add the first test case to the test suite.
  i) Right-click the root node of the Test Suite tree (the node labeled Test Suite:<your test suite name>). A shortcut menu will open, as depicted in FIG. 2.
  ii) Choose Add Tool Test><tool you want to use>from the shortcut menu.
  iii) Select the Test Suite tree node for the tool that you just added, then specify the test parameters for that tool in the right GUI panel, as shown in FIG. 3.
d) Specify one or more output for the tool just added.
  i) Right-click the node that represents the tool to which you want to add a new output (You can have multiple tools perform operations on the result of one tool by adding multiple outputs to the appropriate tool node. Alternatively, you can have an output to perform an operation on the result of another output by adding a new output to an existing output node). A shortcut menu will open, as shown in FIG. 4.
  ii) Choose Add Output><tool you want to use>from the shortcut menu Many basic output tools are listed under the New Output menu. Tools that have already been used in the current test are listed in the Existing Output menu.
  iii) Select the Test Suite tree node for the output tool that you just added, then specify the test parameters for that tool in the right GUI panel, as shown in FIG. 5.
  iv) Repeat steps i–iii if you want to add additional outputs.
e) Add additional test cases by repeating steps c–d above. To remove a test case, right-click the test case that you want to remove, then choose Remove from the shortcut menu.

When the invention runs test cases, it performs all operations specified by selected tests and output parameters. A SOAP client test involves sending a request, receiving the response, and verifying the response by applying other tools. Creating a SOAP client test requires selecting the SOAP Client tool and specifying the call information. The SOAP Client tool behaves as a client in order to exercise the server. In one embodiment, the invention includes automatic serializers, enabling a simple way to complete values in the GUI. Specify the URL to a WSDL to enable the invention to extract information such as the RPC Router, the methods contained in the service, and the target URIs and signatures of each method.

Figure 6A:
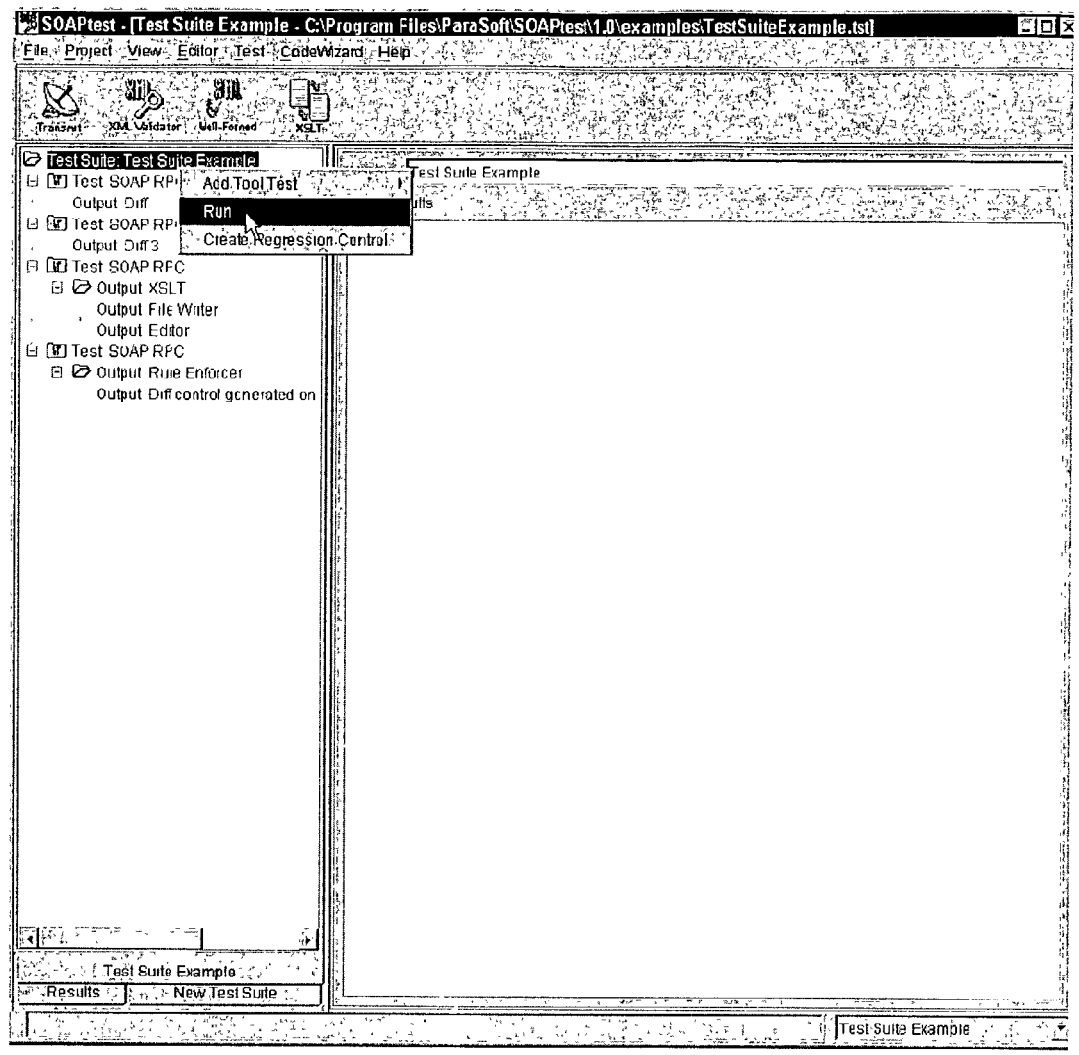
Figure 6B:
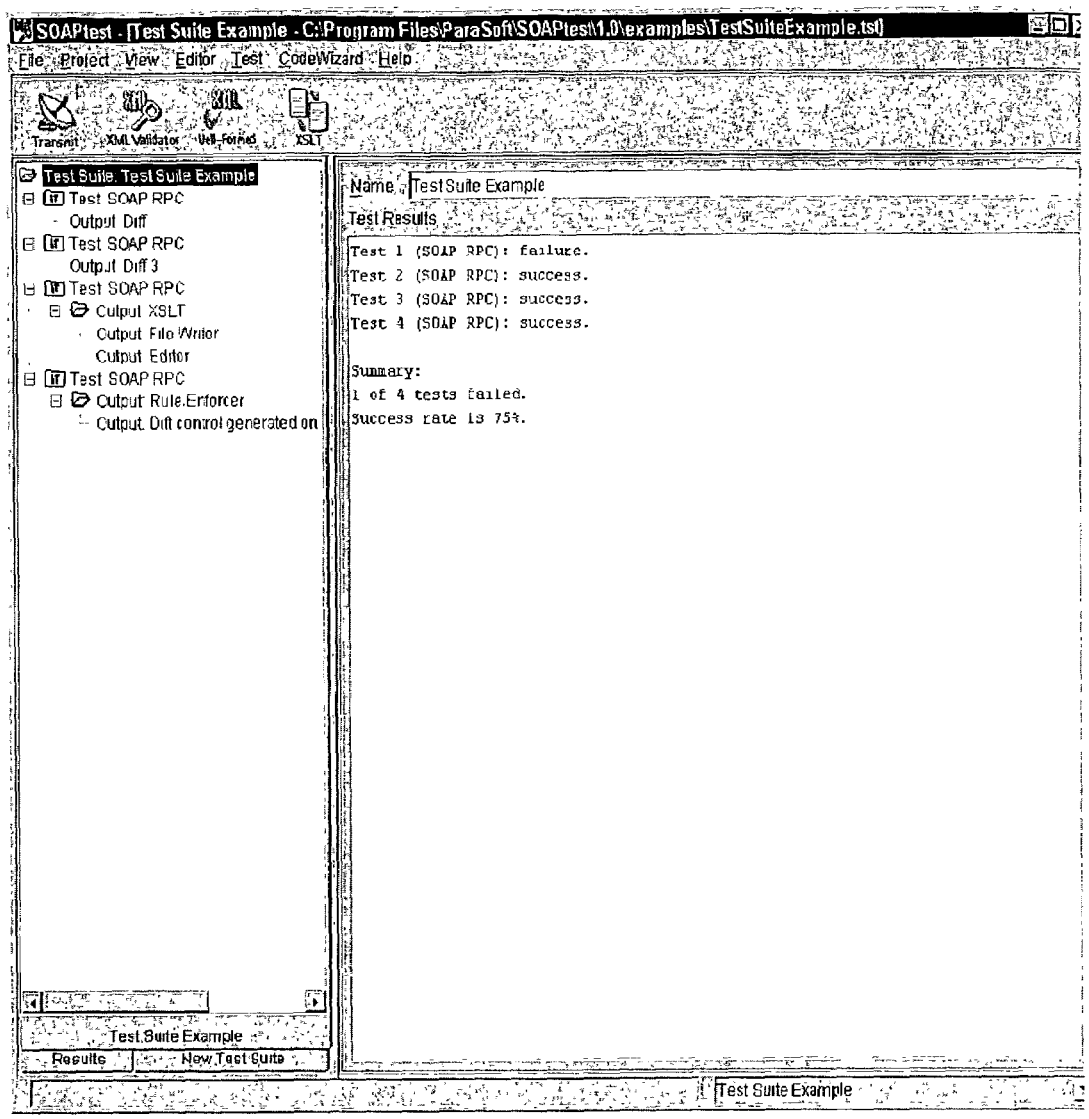

To run all test cases in the test suite:
  Right-click the root node of your Test Suite tree, then choose Run from the shortcut, as illustrated in FIG. 6A.
  In one embodiment, the invention runs all available test cases, then report the outcome of each test (success or failure) and the test suite's overall success rate, as depicted in FIG. 6B.

Figure 6C:
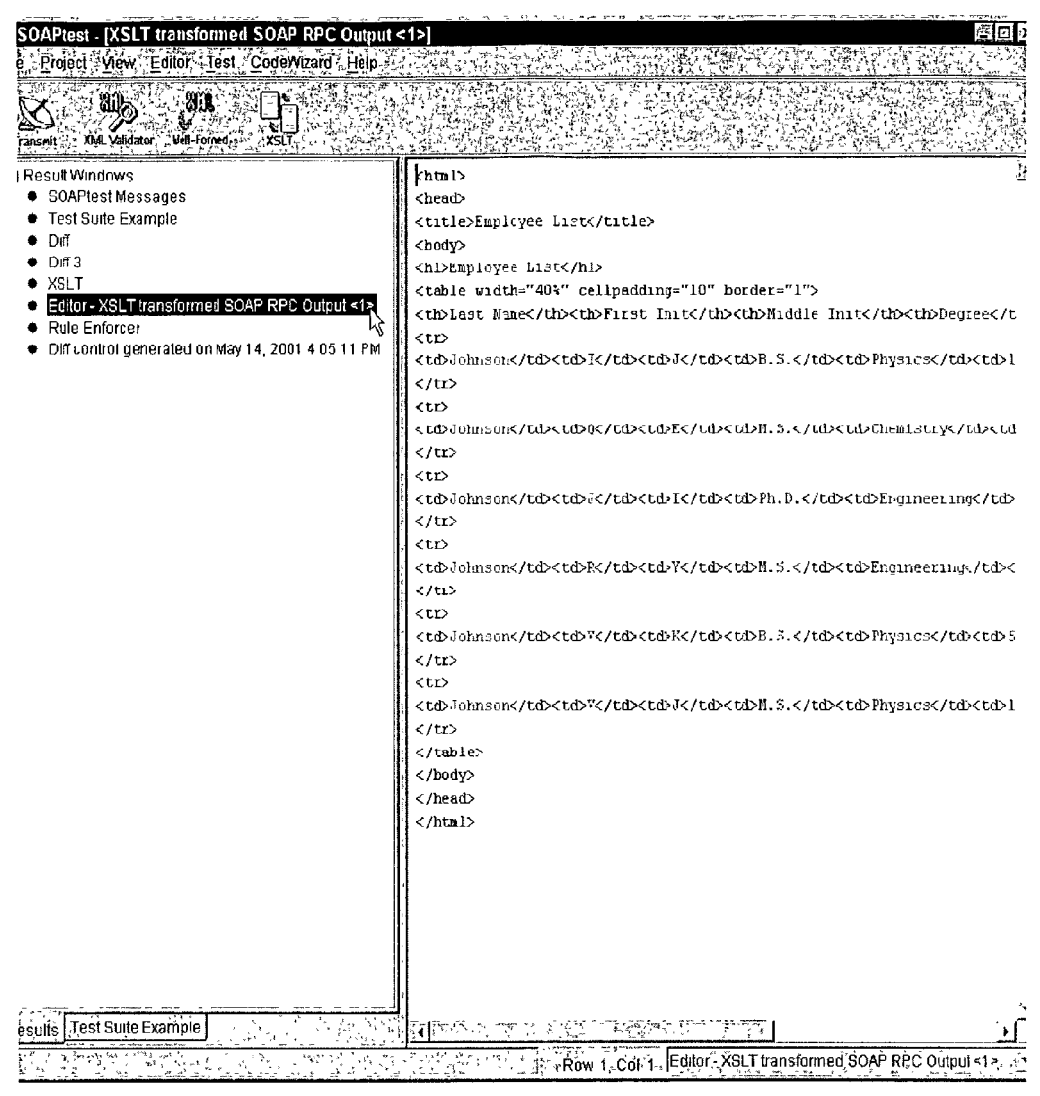

The results of a particular tool can be accessed by choosing that tool's name in the View Selector (in the bottom right corner of the GUI) or by clicking the appropriate node of the Results tab in the left side of the GUI, as shown in FIG. 6C.

To run a single test case:
  Right-click the root node of the test case that you want to run (for example, the Test: SOAP RPC node), then choose Run from the shortcut menu.

You can access the results of a particular tool by choosing that tool's name in the View Selector (in the bottom right corner of the GUI) or by clicking the appropriate node of the Results tab in the left side of the GUI.

Regression test provides an easy way to determine whether any functionality of the Web service changes. The invention can automatically create regression controls for your SOAP Client and Rule Enforcer test cases. When prompted to do so, it creates Diff controls with the current outcomes of the selected test cases, then adds these Diff controls to the appropriate test cases. To automatically create a regression test control based on existing outputs, right-click the node representing a single test or the node representing the entire test suite, and choose Create Regression Control from the shortcut menu. The invention then adds a Diff tool to all selected tests. Each time this tool is used, it compares the results of the control test to the current test run.

The following is a typical way to have the invention automatically create regression controls for the test suite:
  Right-click the root node of your Test Suite tree, then choose Create Regression Control from the shortcut menu.

To have the invention automatically create a regression control for a specific test suite:
  Right-click the Test Suite tree node that represents the test case for which you want to create a regression control, then choose Create Regression Control from the shortcut menu.

The next time the invention runs a test case with a Diff control, it will compare the actual outcomes with the outcome specified in the Diff controls. If you ran the entire Test Suite, failed regression tests will be reported in the main test results. You can always access the results of a particular regression test by choosing the appropriate Diff tool's name in the View Selector (in the bottom right corner of the GUI) or by clicking the appropriate Diff node of the Results tab in the left side of the GUI.

If a user wants to perform regression testing on a test case, but does not want to use the current outcome as the comparison value, preferably the user needs to define her own Diff control for that test case.

To define a Diff control for a test case:
a) Right-click the root node of the test case that you want to run (for example, the Test: SOAP RPC node), then choose Add Output>New Output>Diff from the shortcut menu.
b) Select the Output: Diff node, then indicate what reference value you want the invention to use. If you want to enter the value, select the Text button, then enter the reference value in the Text field. If you want the invention to use a value stored in a file, select the File button, then enter or browse to the file that contains the reference value.

The next time the invention runs this test case, it will compare the actual outcome with the outcome specified in the Diff control. If you ran the entire Test Suite, failed regression tests will be reported in the main test results. You can always access the results of a particular regression test by choosing the appropriate Diff tool's name in the View Selector (in the bottom right corner of the GUI) or by clicking the appropriate Diff node of the Results tab in the left side of the GUI.

If you want to repeat a test suite after you are done with testing, you should save it so that you can easily re-open and re-run it.

To save a test suite:
a) Right-click the unused area of the Test Suite tab for the test suite that you want to save. A shortcut menu will open.
b) Choose Save As from the shortcut menu. A file chooser will open.
c) In the file chooser, specify where you want to save this test (.tst) file.

The invention will then save the current test suite in the specified location.

To close a test suite:
a) Right-click the unused area of the Test Suite tab for the test suite that you want to save. A shortcut menu will open.
b) Choose Close from the shortcut menu.

The invention will then close the current test suite and remove the appropriate tab from the left side of the GUI.

To open an existing test suite:
Choose Test>Open Test, then use the file chooser to specify which test suite you want to open. A tab for the selected test suite will be added to the left side of the GUT.

Table 1 includes some exemplary tools available for tests and/or outputs.

TABLE 1

| Name | Purpose | Test? | Output? |
|---|---|---|---|
| Check Well Formedness | Checks whether XML files are well-formed. | Y | Y |
| Create XML Dictionary | Creates a dictionary from which you can create your own rules. | Y | Y |
| Diff | Compares files or outcomes. | Y | Y |
| Editor | Sends results to internal editor. | N | Y |
| External Tool | Invokes an external tool. | Y | N |
| File Writer | Invokes the File Writer tool that can create files. | Y | Y |
| Java Method | Sends output to a Java method. | Y | Y |
| Rule Enforcer | Applies the rule or set of rules associated with that enforcer. | Y | Y |
| SOAP Client | Send SOAP messages. This tool is the foundation of most test cases | Y | Y |
| Transmit | Lets you transmit and receive over a socket connection. | Y | Y |
| XSLT | Transforms XML files. | Y | Y |
| Validate XML | Checks whether XML files are valid | Y | Y |

You can use most of the above tools as tool tests. Some SOAP tests use the SOAP RPC as the foundation of the test, then add other tools to process the results.

For example, you if you wanted to test if a certain SOAP remote procedural call always returned the same output for a given input, you might create a SOAP Client test, then use a Diff control as its output. Alternatively, if you wanted to test whether a Web service returned values in a correct format, you might create a SOAP Client test, then use a Rule Enforcer to apply a set of rules that checked if the output matched a certain required pattern. If it did, you could attach a regression control to the Rule Enforcer; the invention would then alert you if the Web service failed to match that required pattern in subsequent tests.

Check Well-Formedness tool checks whether XML files are well-formed. A well-formed document should preferably conform to the following guidelines:
All elements that require both start and end tags have both start and end tags.
Elements nest properly within each other.
Attribute values should be quoted.

This tool can be used as part of a test case, or it can be applied to a file or set of files opened in the Project tree.

Before you run this tool as a tool test in a test case, you need to specify what the tool should check. (If you use this tool as an output, the invention assumes that you want it to check the result of the test or output to which it is attached). You can specify this in the Check Well-Formedness Parameters panel. To open this panel, select the Test: Check Well-Formedness node in your Test Suite tree.

Create XML Dictionary tool creates a dictionary that you can use to create custom rules and queries. The dictionary created by this tool contains a library of the elements used in the file from which it was created.

Before you run this tool as a tool test in a test case, you need to specify what file or text the invention should base the dictionary on. (If you use this tool as an output, the invention assumes that you want it to use the result of the test or output to which it is attached). You can specify this in the Create XML Dictionary Parameters panel. To open this panel, select the Test: Create XML Dictionary node in your Test Suite tree.

Diff tool compares two files or outcomes and reports what (if any) differences there are between the two files or outcomes. If you are using this tool as an output, you need to specify the reference value against which you want to compare the input value. You can specify this value in the Diff Parameters panel. To open this panel, select the Output: Diff node in your Test Suite tree.

If you are using this tool as a tool test, you need to specify the input value and the reference value against which you want to compare the input value. You can specify both of these values in the Diff Parameters panel. To open this panel, select the Test: Diff node in your Test Suite tree. In the Diff Parameters panel, specify the file or text you want to check in the Input portion of the panel, then specify the reference value in the Tool portion of the panel.

Editor tool sends data to internal editor. This tool is primarily used to provide a way to access the files that the File Writer tool creates. To modify Editor settings, choose Editor>Preferences. This will open an Editor panel that you can use to modify the following options:
Tab Setting: Lets you determine the number of spaces inserted after the tab button is pressed and whether or not the editor keeps tabs.
End-Of-Line Marker: Lets you determine whether the editor uses a UNIX or MS-DOS format end-of-line marker.

External tool let users include an external tool in their test cases. Before you run this tool as part of a test case, you need to provide the invention with information about how to access and use it. You can specify this in the External Tool panel. To open this panel, select the External Tool node in your Test Suite tree.

In the panel, you can specify the following parameters:
Name: Enter the name of this tool.
Executable: enter (or browse to) the name and path of the executable file associated with this tool.
Arguments: Enter any arguments that you want to pass to that tool.
Keep output: Select this option if you want this tool's output to be displayed in the Results panel
Output pattern: Determines the output's format. Enter format using regular expressions. For example, if a tool's output pattern was 1:magic one.htm (where 1 is the line number, magic_space is an expression, and one.htm is the file name), you would enter: (*)(:magic)

(*). This expression says that for anything to the expression ":magic", then anything. (anything is represented by (.*)).

Pattern keys: Tells the invention the line number and file name from the output pattern, in the terms of your selected source editor. For example, if you were describing the output pattern above (1:magic one.htm) in an editor where "l" represents line number, "s" is used as a dummy symbol, and "F" represents file name, your pattern keys would be 1sF. If you were using Write, your pattern key might be F.

MIME Types: Specifies the types of files the tool works with.

Input: Specifies the file or text to which you want the invention to apply this tool.

File Writer tool can convert other output data to files. The Editor tool is often used in conjunction with this tool because it provides a means to view the files that the File Writer creates. If you are using this tool as an output, you need to specify how you want this tool to name and save files. You can specify these parameters in the File Writer Parameters panel. To open this panel, select the Output: File Writer node in your Test Suite tree. You can then specify the following parameters:

Name: Determines the name of this tool.

Target Name: Determines how this tool names the file it creates. You can enter a specific name for a file, or use wildcards where appropriate. Some acceptable wildcards include:

% b: Base name of original file (no extension).

% f: Original file name (with extension).

% e: Extension of original file name.

Target Directory: Determines where this tool places the file it creates.

Override directory from input: Determines whether this tool saves the files it creates in the same directory as the source file (if available). If this is not checked and the Target Directory specifies a directory other than the one that contains the original source files, the FileWriter will save the file in the same directory as the source file.

If you are using this tool as a tool test, you need to specify what data the File Writer should write to a file as well as information about how you want this tool to name and save files. You can specify these parameters in the File Writer Parameters panel. To open this panel, select the Test: File Writer node in your Test Suite tree. You can then specify the parameters as described above.

Java Method tool lets you send output to a public static Java method. This is useful if you want to perform application-specific checks that cannot be expressed with a rule (for example, if you want to check if a given output matches a record in a database). The method used should have a single parameter of type 'Object' and a return type of 'boolean'. It should return "true" for passed tests and return "false" for failed tests. To use this tool, you need to specify the name of the class containing this method and the name of this method. You can specify this in the Java Method Parameters panel. To open this panel, select the Output: Java Method node in your Test Suite tree.

Rule Enforcer tool applies the customized rules that you have created and associated with a particular enforcer. The Rule Enforcer's actions are determined by the nature of the associated rule(s). Rules can look for problems in the data returned by your Web service, check whether its responses always match certain general patterns, or simply query your Web service. You can check whether a Rule Enforcer produces consistent results by attaching a regression control or Diff output to that Rule Enforcer.

If you are using this tool as an output, you need to specify what rule or rule set it should enforce. You can specify both of these values in the Rule Enforcer Parameters panel. To open this panel, select the Output: Rule Enforcer Parameters node in your Test Suite tree.

If you are using this tool as a tool test, you need to specify what rule or rule set it should enforce as well as what file or text it should apply this rule to. You can specify both of these parameters in the Rule Enforcer Parameters panel. To open this panel, select the Test: Rule Enforcer node in your Test Suite tree. In the Rule Enforcer Parameters panel, specify the file or text you want to check in the Input portion of the panel, then specify the rule or rule set in the reference value in the Tool portion of the panel.

SOAP Client tool is used to perform SOAP messaging. This tool is the foundation of most test cases. To perform a SOAP Client test, you need to tell the invention how to execute the call. This involves specifying the following parameters in the SOAP RPC Parameters panel (this can be accessed by selecting the Test: SOAP RPC node in your Test Suite tree):

WSDL URI: Enter the WSDL URI where this Web service can be accessed.

Description: (Automatically completed if available): Describes the Web service at the given WSDL URI.

RPC Router: (Automatically completed if available) Describes how to access the RPC router.

Method name: (Automatically completed if available) Lists the available methods you can call and test. The list of methods is created automatically when a valid WSDL URI is entered. You can select which method you want to test by selecting a method from the list.

Return type: (Automatically completed if available) Lists the selected method's return type.

Target object URI: (Automatically completed if available) Lists the target object's URI.

Encoding Style URI: (Automatically completed if available) Lists the encoding style URI used to send requests.

Parameters: (Automatically completed if available) Lists the parameters available for the selected method.

Name: (Automatically completed if available) Lists the name of the selected parameter.

Type: (Automatically completed if available) Lists the type of the selected parameter.

Encoding: (Automatically completed if available) Lists the available encoding URIs for receiving requests. This list is created automatically. You can select which encoding type you want to use by selecting a type from the list.

Value: Determines if you want to use a literal value (i.e., a string) or a generated value (i.e., if you want to programmatically specify the value to pass as a parameter).

Value text field (below the value option): Lets you specify the string or generated value that you want to pass a parameter. If you are using a generated value, you need to enter a static Java method that returns an object and that meets the signature the Web service is expecting. The invention will then transform the class into a SOAP parameter and send it as a SOAP call when the test case is executed.

After you run a test, the output of the test will be displayed in the Output window at the bottom of this panel. If the MIME type of the output is not text/plain, you need to select the proper MIME type value from the drop-down list in order to have your output reported correctly.

Transmit tool lets you transmit and receive over a socket connection. It IS used for communicating directly with a specific port of a host. It can also be used to listen at a particular port if you are expecting something sent to some specific port on your machine.

You can use this tool to perform a lower level of testing than SOAP Client allows because it looks at the socket connection, which is handled by HTTP and sits one layer below the SOAP call. It is also useful if you have applications communicating through XML over a socket connection; it can be used to perform functional and regression testing of components that communicate using socket-based protocols. This tool can be used as part of a test case, or it can be applied to a file or set of files opened in the Project tree.

If you are using this tool as an output, you need to specify your host machine and the port number that you want to use. You can specify this information in the Transmit Parameters panel. To open this panel, select the Output: Transmit node in your Test Suite tree. If you are using this tool as a tool test, you need to specify what information it should transmit as well as your host machine and the port number that you want to use. You can specify this information in the Transmit Parameters panel. To open this panel, select the Test: Transmit node in your Test Suite tree.

To listen using the transmit tool, right-click the Transmit Test Suite tree node, then choose Start Listening from the shortcut menu that opens. Typically, you do not need a host specified in the Transmit parameters panel if you want to listen; the host parameter is only required if you want to transmit. To stop listening, right-click the Transmit Test Suite tree node, then choose Stop Listening from the shortcut menu that opens. To close the connection to the host, right-click the Transmit Test Suite tree node, then choose Close Connection from the shortcut menu that opens.

Transmit tool supports some output options. These options include:
  stdout
  stderr
  Result Window
  Packetize by New Lines
  Packetize by Documents
  Packetize by MIME Messages
  File XSLT tool transforms XML files using the style described in the specified XSL file. This tool can be used as part of a test case, or it can be applied to a file or set of files opened in the Project tree. If you are using this tool as an output, you need to specify what XSL file it should use to transform the XML it receives. You can specify this in the XSLT Parameters panel. To open this panel, select the Output: XSLT node in your Test Suite tree. In this panel, you can also specify whether you want this tool to store information in using relative paths (instead of absolute paths) and the MIME type of the transformed document.

If you are using this tool as a tool test, you need to specify what XML you want to transform as well as what XSL file it should use to transform the specified XML. You can specify both of these parameters in the XSLT Parameters panel. To open this panel, select the Test: XSLT node in your Test Suite tree. In the XSLT Parameters panel, specify the file or text you want to transform in the Input portion of the panel, then specify the XSL files that you want to use in the Tool portion of the panel. In the Tool portion of the tab, you can also specify whether you want this tool to store information in using relative paths (instead of absolute paths) and the MIME type of the transformed document.

An Editor output is added to this tool by default. Preferably, the FileWriter is used as an output so that the invention writes the output to files.

Validate XML tool checks whether XML files are valid. An invalid XML file does not contain a proper document type declaration and/or does not obey the constraints of that declaration (correct elements, nesting, attributes, attribute values, etc.). This tool can be used as part of a test case, or it can be applied to a file or set of files opened in the Project tree. Before you run this tool as a tool test in a test case, you need to specify what file the invention should check. (If you use this tool as an output, the invention assumes that you want it to use the result of the test or output to which it is attached). You can specify this in the Validate XML Parameters panel. To open this panel, select the Test: Validate XML node in your Test Suite tree.

Test results are displayed in the right side of the GUI. If you tested with a single tool, any problems found will be displayed in the Results panel (in the right side of the GUI). If you ran a test suite or single test case, you can access individual error messages by either:
  Choosing a specific test (for example, Rule Enforcer or the name of a test suite) using the View Selector (in the bottom right side of the status bar).
  Clicking the appropriate node in the Results tab (in the left side of the GUI).

Some of the tools (such as Rule Enforcers, Validate XML, and Check Well-Formedness) report output in tree or table format. When results are reported in this format, the following options are available:
  Browse the file associated with the error message: To do this, right-click the error message, then choose Browse from the shortcut menu.
  Edit the file associated with the error message: To do this, right-click the error message, then choose Edit from the shortcut menu.
  Edit the rule related to a Rule Enforcer error message: To do this, right-click the error message, then choose Edit Rule from the shortcut menu.
  Suppress an error message: To do this, right-click the error message, then choose Suppress from the shortcut menu.
  Clear all results in the current results category (e.g., Rule Enforcer): To do this, right-click the error message, then choose Clear from the shortcut menu.
  E-mail the results: To do this, right-click the error message, then choose Mailto from the shortcut menu.
  Save the results: To do this, right-click the error message, then choose Save As><desired format>from the shortcut menu.

Additional options may be available; the options that are available depend on the specific to the type of error message you are viewing, as well as the format in which you are viewing results. If your results are displayed in tree format, you can quickly expand the entire Results tree by right-clicking the unused area of the Results panel, then choosing Expand All from the shortcut menu.

You can change the way that the invention displays results in the Results panel to suit your personal preferences and the nature of your current task. Typical options include:
  Table, by file
  Table, by error
  Tree, by file
  Tree, by error Typically, table vs. tree tends to be a personal preference: trees are more structured than tables, but tables consume less window space. Whether you want to see your results listed by file or by location usually depends on what task you are trying to accomplish.

To change the way that results are displayed:
a) Right-click anywhere in the Results panel. A shortcut menu will open.
b) Choose View><desired view type>from the shortcut menu.

Figure 7A:
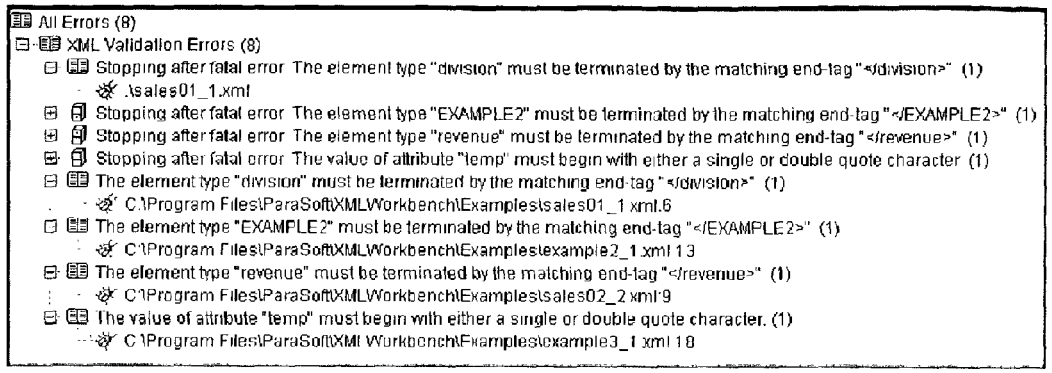

Results will then be displayed in the format that you selected. The invention will continue displaying errors in the selected manner until you configure it to do otherwise. FIG. 7A shows an exemplary screen for a tree view by error. FIG. 7B depicts an exemplary screen for a tree view by file. FIG. 7C illustrates an exemplary screen for a table view.

You can suppress error messages that you do not want to see using the suppression feature of the invention. For example, you may want to suppress a particular error as soon as you have corrected it; this will make it easier for you to see what errors still need to be corrected. You could also suppress errors that are not relevant to your project.

When you suppress an error message, you are given a choice between suppressing the error message permanently or temporarily. A message that is suppressed permanently will be suppressed for all future test runs, until you remove the permanent suppression option. Temporary suppressions will automatically be removed the next time that you run the tool that produced the error.

To suppress a particular error message:
a) In the Results panel, right-click the error message that you want to suppress. A shortcut menu will open.
b) Choose Suppress from the shortcut menu.
c) In the window that appears, click Just this error, then click the appropriate button to indicate whether you want the invention to suppress this error temporarily or permanently.
d) Click OK.

To suppress all errors that occur in a file:
a) Right-click any error that occurs in the page whose errors you want to suppress.
b) Choose Suppress from the shortcut menu.
c) In the window that appears, click All errors in <filename>, then click the appropriate button to indicate whether you want the invention to suppress this error temporarily or permanently.
d) Click OK.

You can also suppress all errors that are caused by the same file or "rule." For example, you could suppress all errors related to (but not in) junk.htm, a file that you are going to remove from your site, or you could suppress errors relating to a specific type of test or rule.

To suppress all errors that have the same cause as a selected error:
a) Right-click any error that has the same cause (a file or a rule) as the type of errors that you want to suppress.
b) Click Suppress in the shortcut menu.
c) In the window that appears, click All errors from <source of error>or All references to this page, then click the appropriate button to indicate whether you want the invention to suppress this error temporarily or permanently.
d) Click OK.

If you later decide that you want to see results that you have permanently suppressed:
a) Open the Edit Suppressions window by doing one of the following:
Right-clicking any error message, then choosing Edit Suppressions from the shortcut menu that opens.
Choosing View>View Suppressions.
b) In the Suppressions window, select the suppression item you want to unsuppress.
c) Click Delete.

This suppression will then be removed. Errors that were previously suppressed by this suppression will be reported in future test runs. You can use the suppression counter to keep track of how many times the invention has encountered a specific error or type of error that you suppressed permanently. To view the number of hits for each suppression, choose View>View Suppressions, then look at the number of hits displayed next to each suppression. If you want to reset the number of hits for a certain suppression to zero, select the suppression whose hits you want to reset, then click Reset Hits.

When you add a suppression, it is applied only to files in the site from which you created the suppression. Such suppressions are called site-specific suppressions. If you want certain permanent suppressions to apply to all sites that you test in the invention, you should change the suppression to a user-specific suppression. To change a suppression from site-specific to user-specific (or vice versa):
a) Open the Edit Suppressions window by doing one of the following:
Right-clicking any error message and choosing Edit Suppressions from the shortcut menu that opens.
Choosing View>View Suppressions.
b) Select the suppression item whose type you want to change.
c) Click Swap. The suppression item will then be moved to the alternative suppression type (from site-specific to user-specific, or from user-specific to site-specific).

You can customize many preferences in the Preferences panel. To access this panel, choose File>Customize Preferences. Once this panel is open, you can modify the following settings.

Figure 8A:
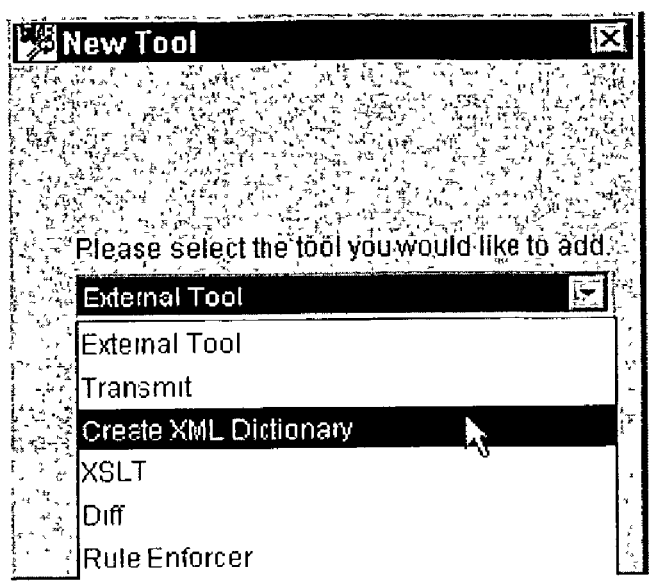
FIGS. 8A–8H are exemplary GUI screens for different settings, according to one embodiment of the present invention.
Figure 8B:
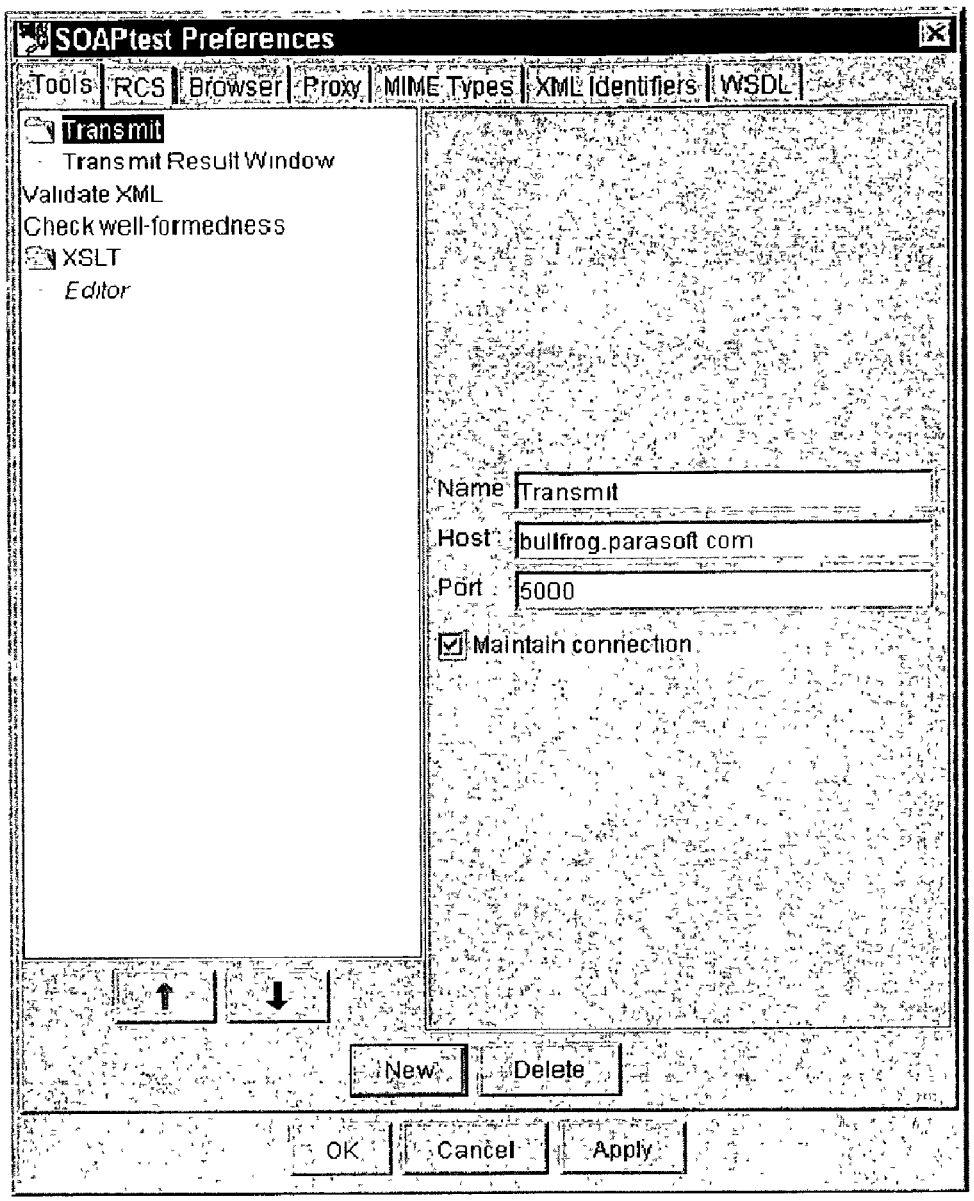

You can customize settings related to the tools in the invention tool bar by modifying options in the Preferences panel's Tools tab, as shown in FIG. 8B. You can modify existing tools' settings by clicking the node that represents the tool you want to configure, then changing the options available in the right side of the panel. You can also add an existing tool (such as Create Dictionary or Diff) or an external tool to the tool bar by clicking the new button, then selecting the tool that you want to add from the dialog box that opens, as depicted in FIG. 8A.

In one embodiment, the invention is configured to work with any RCS-based source control: if you have your source control set up correctly, you can check files in and out of your source code repository by right-clicking the Project tree node that represents the file that you want to check in or check out, then choosing the appropriate Check in or Check out option from the shortcut menu that opens.

Figure 8C:
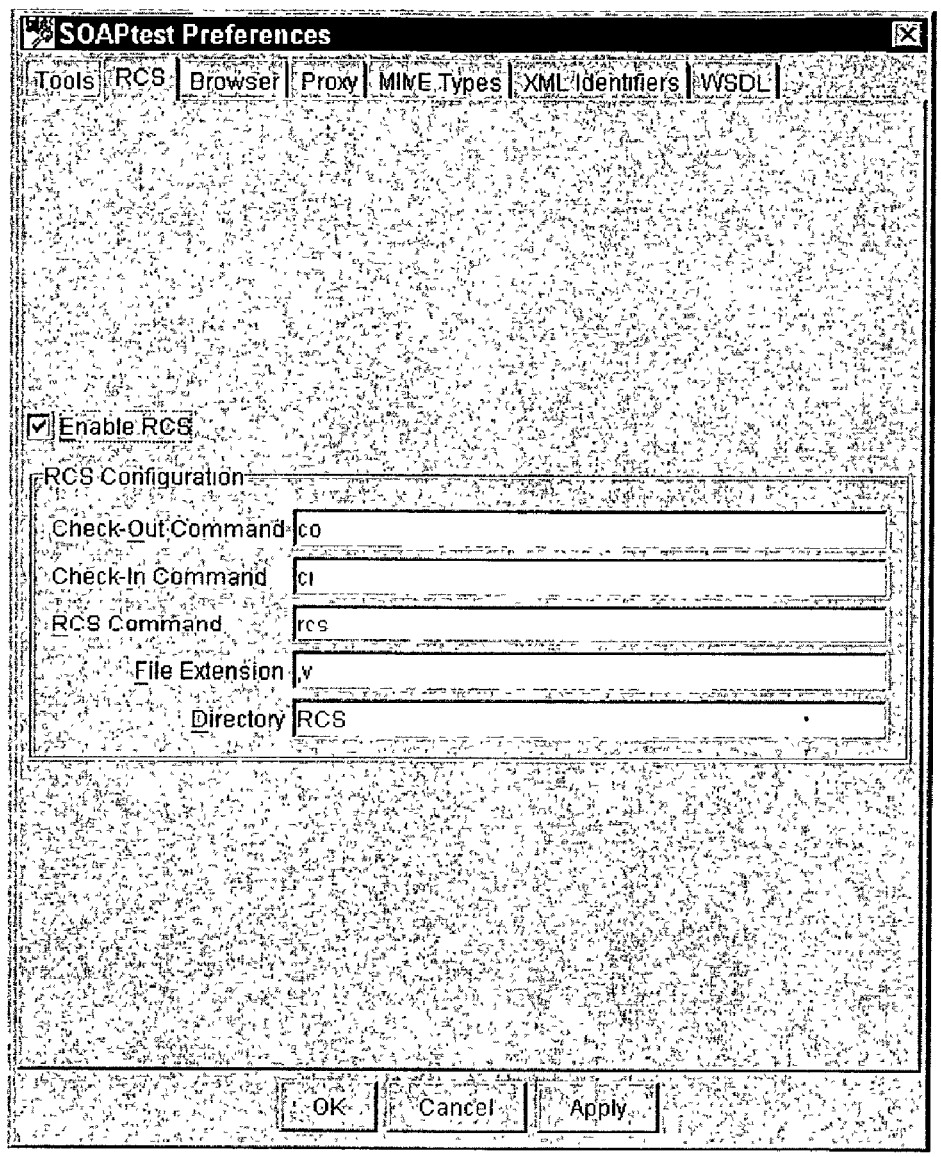

To integrate your source control system:
a) Choose File>Customize Preferences to open the Preferences panel of FIG. 8B.
b) In the Preferences panel's RCS tab, check the Enable RCS check box, as shown in FIG. 8C.
c) In the Check Out Command field, enter the name (and full path, if necessary) of your check out ("co") command.
d) In the Check In Command field, enter the name (and full path, if necessary) of your check in ("ci") command.

e) In the RCS field, enter the name (and full path, if necessary) of your "rcs" command.
f) In the File Extension field, enter the file extension of files under software configuration management. This value is usually, v but some ports have been configured to use other extensions (for example, % v).
g) (Optional) If you use RCS to store the archived files in a subdirectory, enter that name in the Directory field. Typically, the name is "RCS".

Figure 8D:
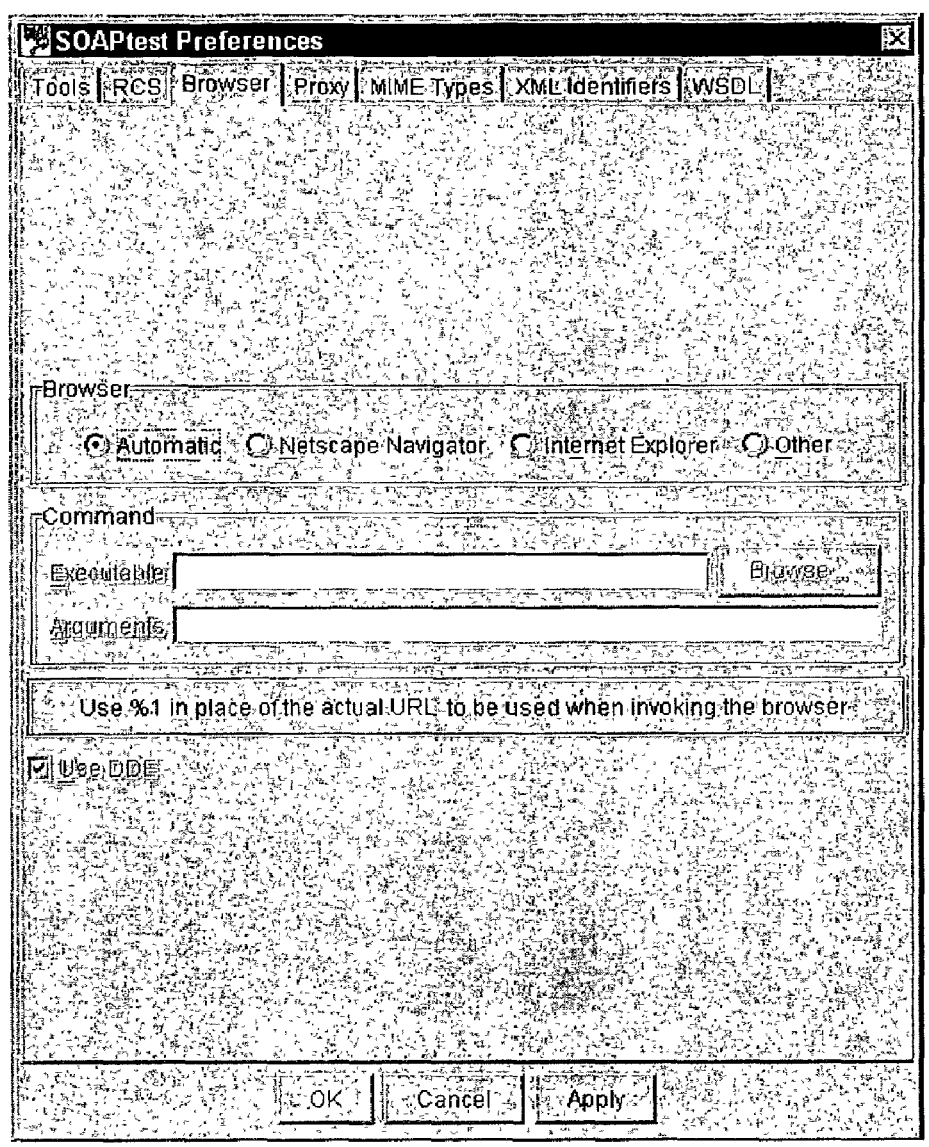

When you browse Web files, the invention will open them in your system's default browser unless you customize the browser settings in the Preferences panel, as shown in FIG. 8D. The Browser panel includes the following browser options:

Browser: Determines what browser the invention uses.
Command: Determines browser commands such as executable name and arguments that you want the invention to pass to that browser. If you select a browser name that is provided, the invention will automatically fill in both Executable and Arguments. If you select Other, you can click Browse to navigate to the appropriate Executable settings. For Arguments, enter "%1".
Use DDE: Determines whether or not Dynamic Data Exchange (DDE) lets programs share information. If you select Use DDE, the changes you make to files as you are using the invention will automatically be applied to other programs that use those same files. Use DDE is selected by default and may not be disabled for the Automatic option in the Browser field. It is selected by default but may be disabled for Netscape Navigator and Internet Explorer. When Other is selected in the Browser field, Use DDE is disabled by default and may not be enabled.
Click OK.

The invention works with proxy servers. To configure it to work with your proxy server, customize the settings in the Preferences panel's Proxy tab illustrated in FIG. 8E.

If you want to use the current system proxy configuration, check the System Proxy Configuration check box. The invention will then enter your system proxy settings in the grayed out fields.
If you want to specify proxy settings, make sure the System Proxy Configuration check box is clear, then enter your proxy setting information in this tab.
If you want to use the same proxy server for all protocols, check the Same proxy server for all protocols check box, then enter the address and port of the proxy server you want to use in the Proxy Address and Proxy Port fields.
If you want to use different proxy servers for different protocols, clear the Same proxy server for all protocols check box, then enter the address and port of each proxy server you want to use in the Proxy Address and Proxy Port fields.
If your proxy server requires authentication, check the Enable proxy authentication check box, then enter a valid user name and password in the Username and Password fields.

Figure 8E:
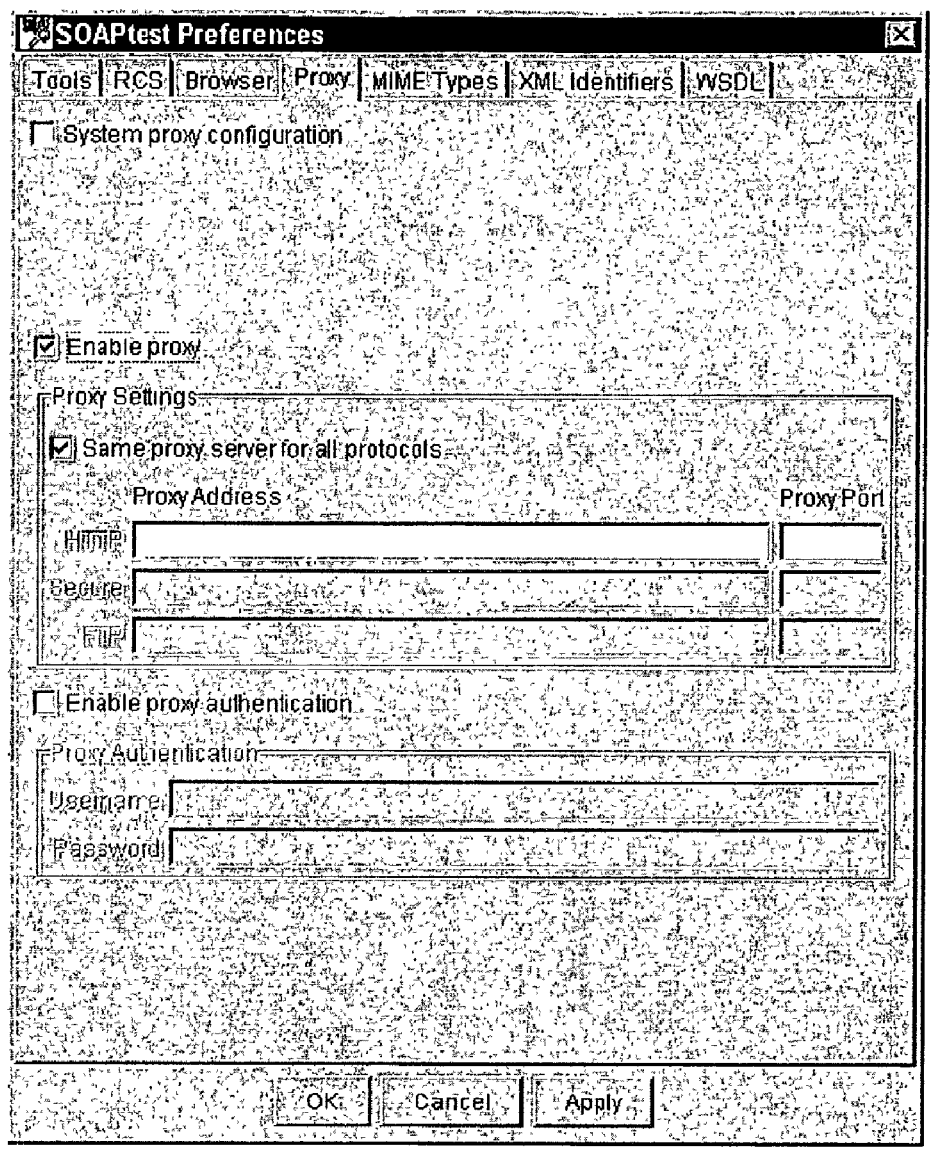
Figure 8F:
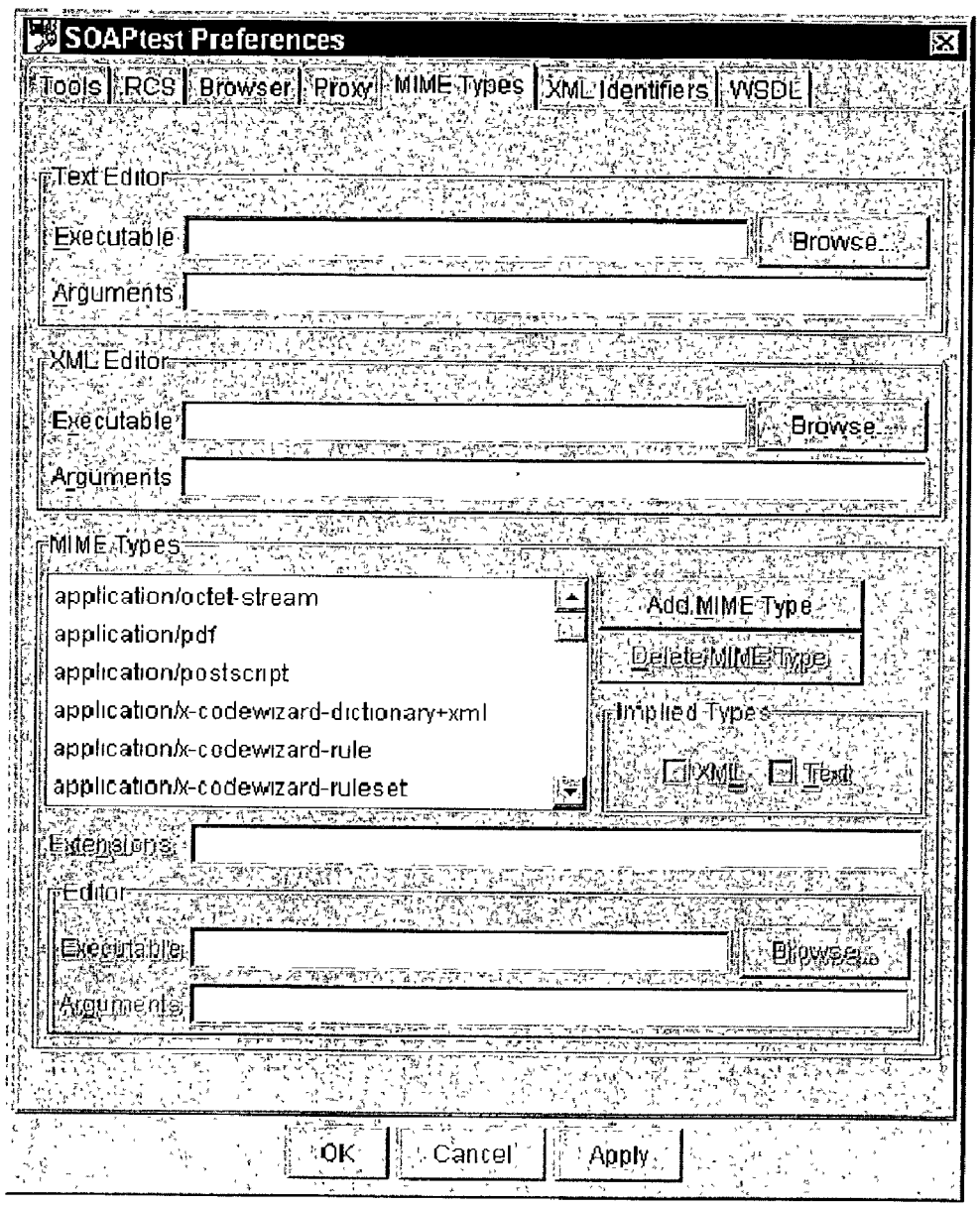

The exemplary MIME Types tab of FIG. 8F lets you add and remove MIME types. In addition, it lets you specify the location of your preferred text and XML editors and lets you specify what editor you want to use to edit all files that have a particular MIME type.

Figure 8G:
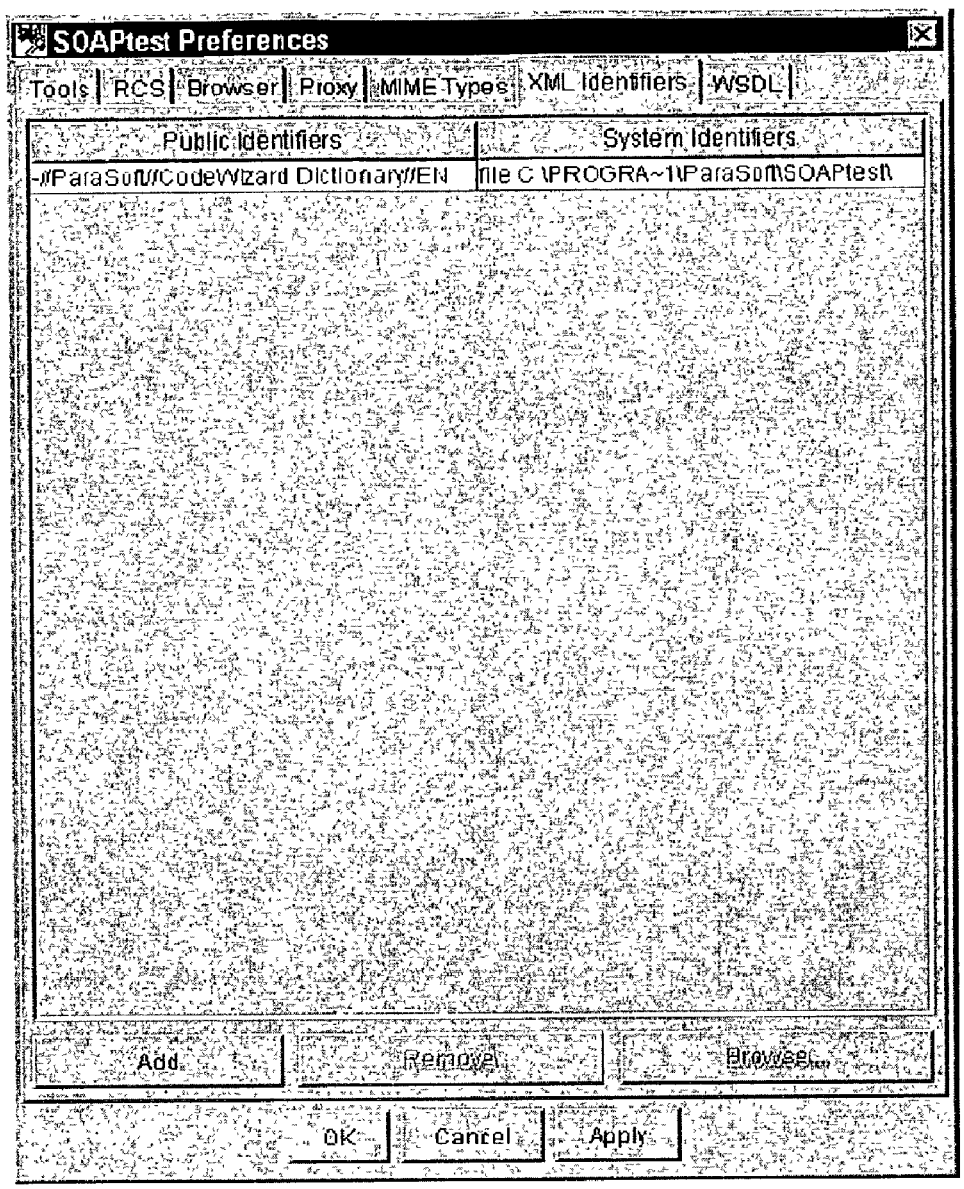
Figure 8H:
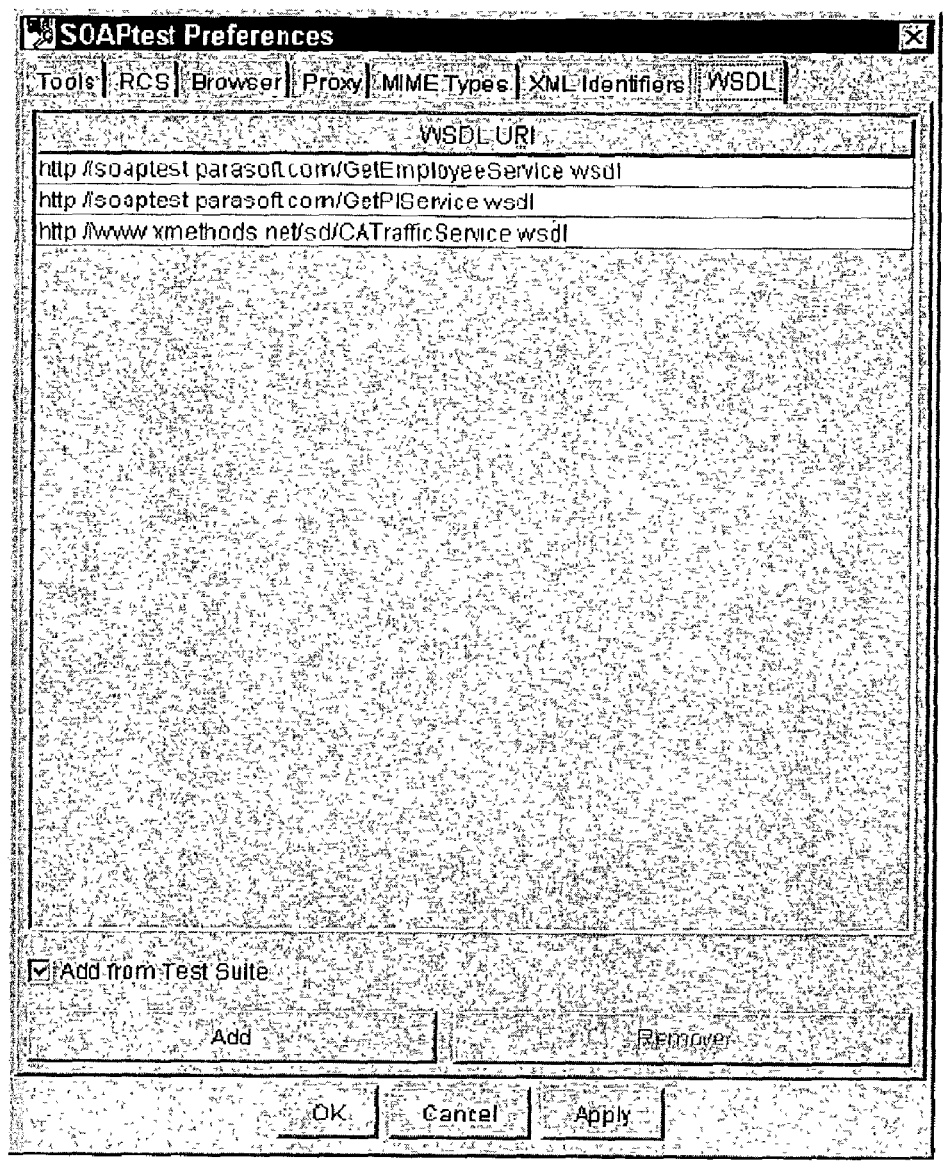

You can map public XML identifiers to system XML identifiers in the Preferences panel's XML Identifiers tab, as shown in FIG. 8G. To create a new mapping, click Add, then use the Browse button to select both your public and system identifiers. To modify an existing identifier, select it, then use the Browse button to select a new identifier. To remove an existing identifier, select it, then click Remove.

By default, the invention saves the WSDL URIs that are used in created test cases. The list of WSDL URIs used is contained in the Preferences panel's WSDL tab If you do not want the invention to save these WSDL URIs, clear this panel's Add from Test Suite check box, as shown in FIG. 8E.

Figure 9:
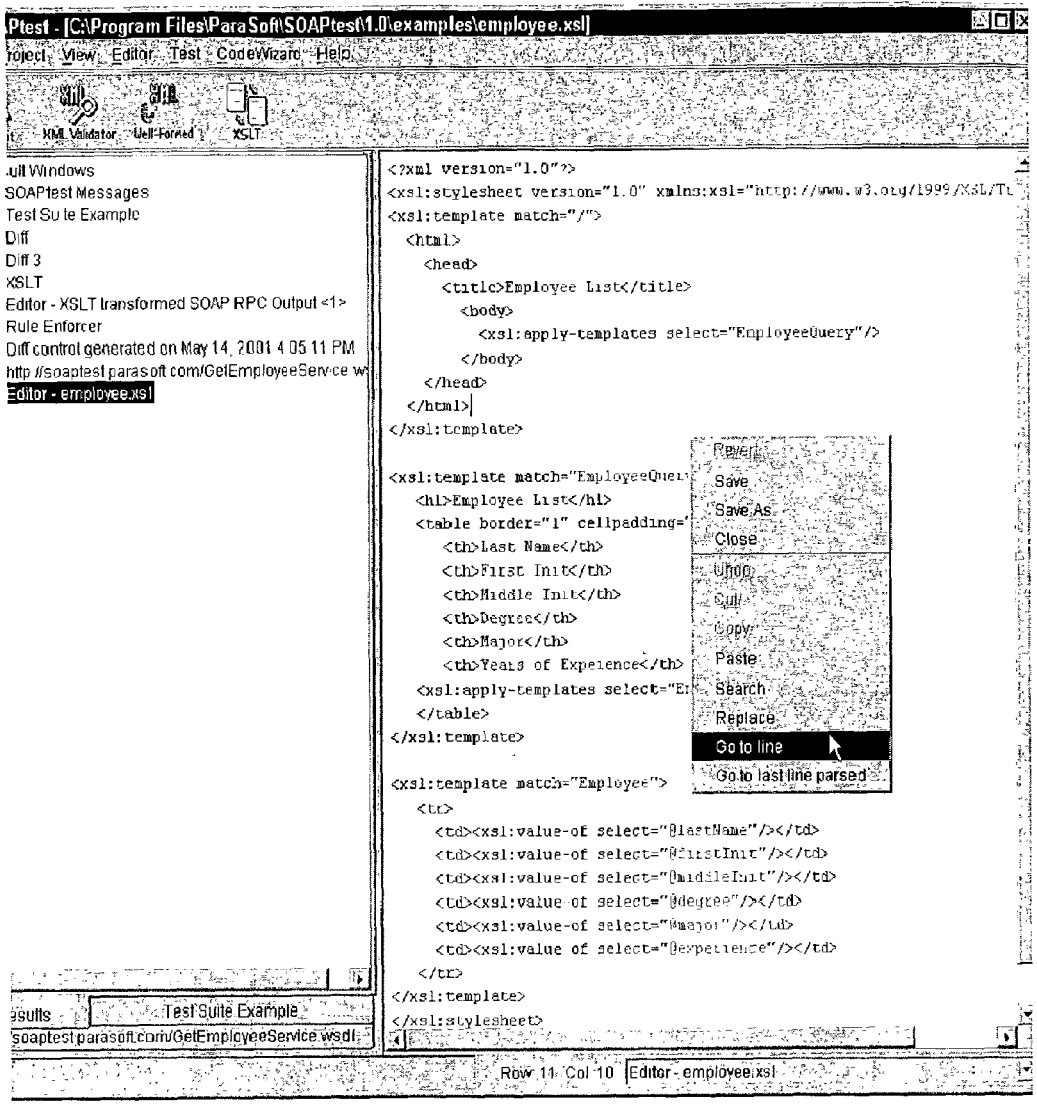
FIG. 9 is an exemplary GUT screen for an Editor tool, according to one embodiment of the present invention.

Additionally, the invention includes an internal editor you can use to view and edit files. An exemplary Editor screen is illustrated in FIG. 9. To open an existing file in the editor, choose Editor>Open, then choose the file that you want to open from the file chooser that opens. To create a new file in the editor, choose Editor>New File, then start creating your file. To save a file, choose Editor>Save or Editor>Save As.

Other conventional editor commands (such as revert, copy, paste, etc.) are also available in the Editor menu and from the shortcut menu that can be opened by right-clicking the any area of the Editor panel. To customize the editor, choose Editor>Preferences. You can then modify tab and end-of-line marker settings in the Editor dialog box that opens. You can also access the menu options from the Editor menu by right-clicking the Editor panel.

If you want to test or transform a set of files (such as a group of files in a certain directory or the files that are on a Web server) you might want to create a project that contains all of your files. You can then apply the Validate XML, Check Well-Formedness, Rule Enforcer, Transmit or XSLT tool to all files, files in a certain directory, or a single file.

A preferred way to work with a set of files is to create a project. A project is a file that can contain one or more site files. Each site contains information about how to access a source. For example, if you are working on two different XML-based Web applications, you might want to create one project file that contains two site files (one for each application you are working on).

Project files provide you with a central place to access and work different groups of files. To create a project file:
a) Choose Project>New Project. The Project tab will open and contain a node named New Project.
b) (Optional) Assign a name to the project by right-clicking the New Project node, choosing Properties from the shortcut menu, then entering the project's name in the Name field of the Project Properties panel that opens.

Figure 10A:
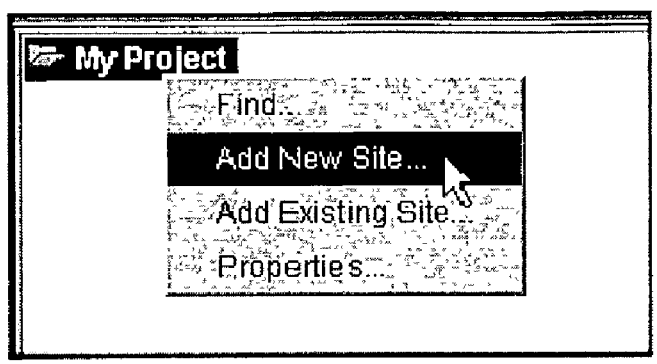
FIGS. 10A–10D are exemplary GUI screens for adding new projects and configuring HTTP connections, respectively, according to one embodiment of the present invention.
Figure 10B:
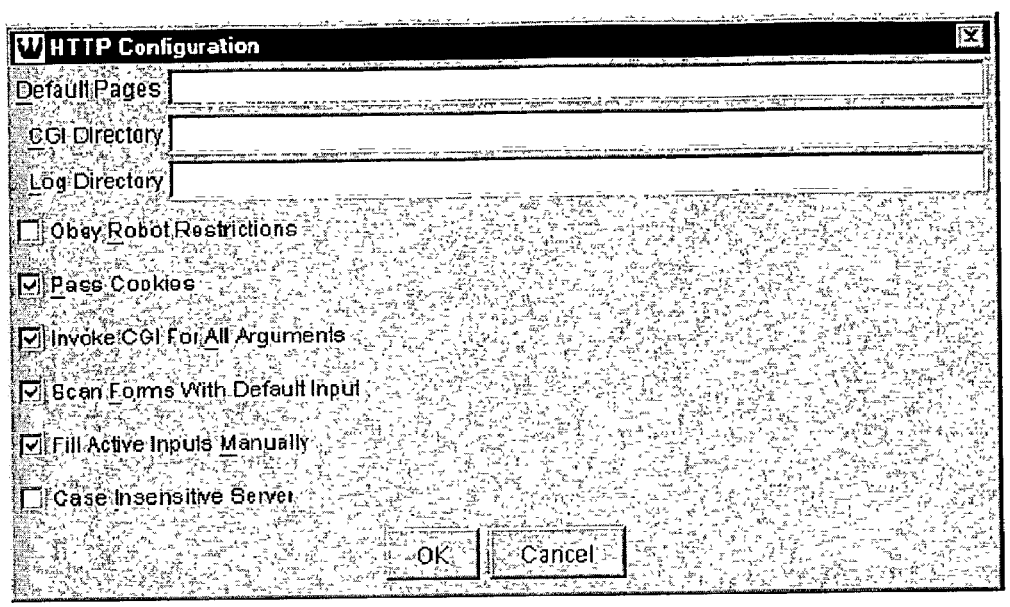

You can add multiple sets of files (sites) to a project file. To add a set of files to the Project:
a) Right-click the root node in your Project tree. A shortcut menu will open, as shown in FIG. 10A.
b) From the shortcut menu, choose Add New Site. The Add New Site panel will open.
c) Indicate the source of the files you want to transform or test in the Source tab. This tab contains the following fields:
Web Server: Enter the name of your Web server (for example, http://www.parasoft.com/index.htm). You can configure additional options by clicking the icon next to the Web Server field. As shown in FIG. 10B, available options include:
Default Pages: Enter the name of your default pages (e.g., index.html, index.htm, default.htm, etc.). To speed up loading, enter an asterisk (*) in this field.
CGI Directory: Enter the directory where your CGIs are located.

Log Directory: Enter the directory where your server log is located.

Obey Robot Restrictions: Tells the invention whether or not to obey robot restrictions. Because robots are often restricted from accessing programs, you should clear this option when you are loading dynamic web sites. You should only clear this option to access sites where you have the permission of the Web site administrator. Typically, this should only be used to get easy access to your own pages without having to modify your Web server.

Pass Cookies: Tells the invention to pass cookies from the site being scanned to the hard drive on which the invention is being run. This option should be checked when you are loading dynamic sites; if it not, you may not be testing the site as thoroughly as possible.

Invoke CGI for All Arguments: Tells the invention to process links to CGI scripts like: <A HREF="/cgi-bln/script.cgi?TEST=1">This option is recommended if you are loading a dynamic site; if it is not enabled, the invention may not be able to reach your dynamic pages.

Scan Forms with Default Input: Tells the invention to automatically submit each form it encounters with the default values (the equivalent of the user simply clicking Enter or Submit). This option is recommended if you are loading a dynamic site.

Fill Active Inputs Manually: Tells the invention to let you manually enter values for each form that it encounters. You should select this option when you are loading dynamic sites in which submitting default values will not fully exercise your site.

Case Insensitive Server: Tells the invention that the named Web server is not case sensitive.

Figure 10C:
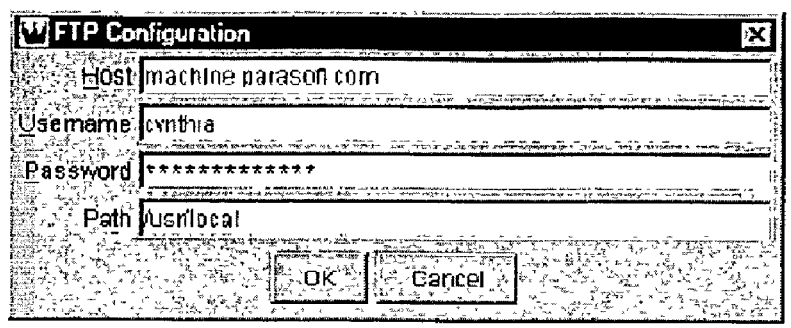

FTP: Enter the name of the FTP server you use to access your files, then configure additional options by clicking the button next to the FTP field, as depicted in FIG. 10C. Configuration options include:

Host: Enter the name of the FTP host.

Username: Enter your username used to access this FTP server.

Password: Enter your password for this site. Note that if you choose to store your password here, it may be available to anyone who has access to your project or site file where the password is stored. If this file is not secure, you should leave this field empty. If you do, you will be prompted for your password whenever it is needed.

Directory: Enter the full path to the directory where your files are stored.

Local Path: Enter the name of the path where your files are locally accessible. You can choose a path by clicking the button next to the Local Path field.

Telnet: Enter the name of the Telnet server you use to perform operations on your files. You can configure additional options by clicking the button next to the Telnet field. Available options include:

Host: Enter the name of the Telnet host.

Port: Enter the port number.

Username: Enter your username.

Password: Enter your password for this host.

Directory: Enter the directory where your files are stored.

Prompt: Enter any arguments that you want automatically entered at the prompt. For example, if your prompt looks like (username)->, enter (username)->here.

d) Click OK. The files will then be added to your Project tree.

If want to add files from other directories/sources to the current site, you will need to add them using indirect links. You should only use indirect links to add a small set of files related the current site; if the files that you want to add are not closely related to the files in the current site, you might want to add an additional site for those files.

Figure 10D:
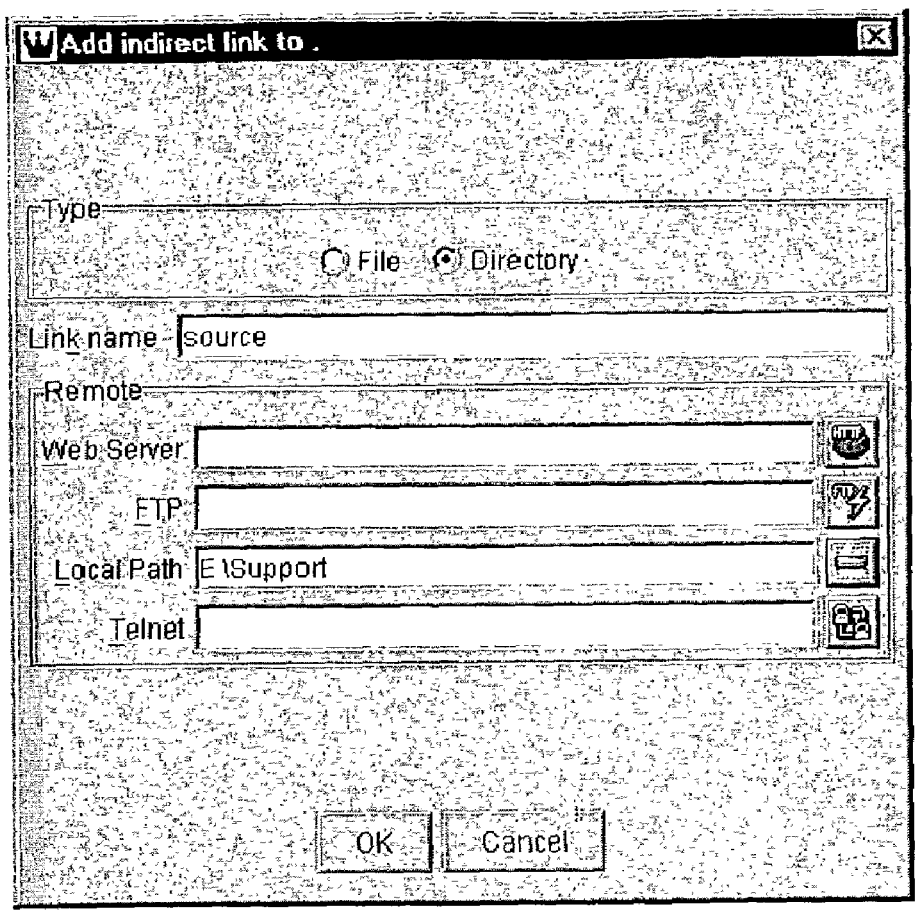
Figure 1B:
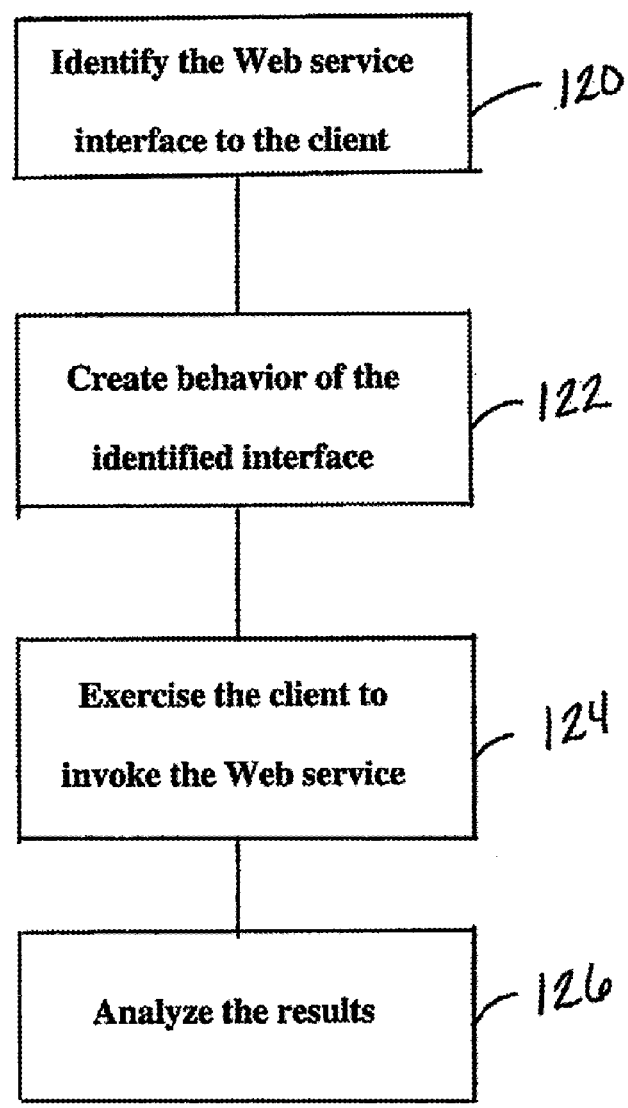

To use an indirect link to source files to a site:
a) In the Project tree, right-click the directory under which you want the file or directory to be located. A shortcut menu will open, as shown in FIG. 10D.
b) Select Create Indirect Link from the shortcut menu. The Add Indirect Link dialog box will open.
c) Complete the Add Indirect Link dialog box.
  i) Indicate whether you are adding a directory or a single file by selecting the appropriate button.
  ii) Enter the name you want to assign to this link.
  iii) Indicate where this source is currently located. Local path and FTP are the preferred type of source, but it best to enter as many media as possible.
  iv) Click OK to close this box and add the specified file or directory to your Site tree.
d) Repeat the above steps to add any additional indirect links.
e) Choose Project>Refresh to refresh your site.

The files/directories referenced in the indirect links will then be added to your Project tree. To save the current project and site files, choose Project>Save.

When you open a project file, all associated site files will also be opened. To open a previously saved project files and the site files it contains, choose Project>Open Site/Project, then choose the .wkj file that represents your project. Before you can test or transform files in a project, preferably, you should have a project open.

To apply Validate XML, Check Well-Formedness, or any Rule Enforcer tool to all project files, a certain directory, or a certain file:
a) Select the Project tree node that represents the files that you want to test. To test all files in the project, select the project's root node. To test all files in a site, select the site's root node. To test all files in a directory, select the directory's root node. To test a single file, select that file's node.
b) Click the tool bar button that represents the tool that you want to apply.
c) If you want the invention to test all directories or paths recursively, click OK in the dialog box that opens. If you only want to test the selected directory or path, clear the check box, then click OK.

The invention will then apply the selected tool and report errors found in the right side of the GUI.

Before you apply the Transmit tool to transmit files in your Project tree, you need to configure it. To do this:
a) Right-click the button for the Transmit tool that is designed to transmit files (this is the button that has an empty receiver), then choose Configure Transmit from the shortcut menu. The Configure Transmit dialog window will open.
b) In the Configure Transmit window, enter your host name and specify which port you wan to use.

c) If you want the invention to keep the specified connection after transmitting the specified data, select the Maintain connection check box.

d) Click OK to close this window and save your settings.

To transmit a single file or all files in (and below) and certain directory, select the Project tree node associated with the file or set of files you want to transmit, then click the appropriate Transmit button. You can also "listen" to socket connections by clicking the appropriate Transmit button. Before you listen, right-click the Transmit tool bar button with the busy receiver, choose Configure Transmit from the shortcut menu, then specify the port you want to use in the Configure Transmit window that opens.

To apply the XSLT tool to all project files, a certain directory, or a certain file:

a) Select the Project tree node that represents the files that you want to transform. To transform all files in the project, select the project's root node. To transform all files in a site, select the site's root node. To transform all files in a directory, select the directory's root node. To transform a single file, select that file's node.

b) Click the XSLT tool bar button.

c) In the dialog box that opens, specify the .xsl file that you want the invention to use to transform the first file. If you want to use the same .xsl file to transform all files in the selected directory, select the remember this file option.

The invention will then transform the indicated file(s).

If you want to configure the XSLT tool bar button to always use a certain XSL file or if you want your transformed documents to have a MIME type other than text/xml, right-click the XSLT tool bar button, choose Configure XSLT from the shortcut menu, then change the parameters in the Configure XSL window that opens.

When the invention finds an XML file that does not contains a proper document type declaration and/or does not obey the constraints of that declaration (correct elements, nesting, attributes, attribute values, etc.), it reports an XML Validation error. The reason for rule is because XML files that are not valid might not be parsed and processed correctly.

For example, the following file is not valid because the NAME element is not declared in the DTD.

<?xml version="1.0"?>
<HR>
<NAME id="Engineering">John Smith</NAME>
<NAME id="Marketing">Jane Smith</NAME>
</HR>
<NAME id="Marketing">Jeremy Young</NAME>

The file and/or the DTD is then corrected so that the file references a DTD and conforms to that DTD.

When the invention finds an XML document that does not follow the syntax of XML (i.e., a document that is not "well-formed"), it reports an XML Not Well-Formed error.

A Well-formed document typically conforms to the following guidelines.

All elements that require both start and end tags have both start and end tags.

Elements nest properly within each other.

Attribute values should be quoted.

The reason for rule is because XML files that are not well-formed might not be parsed and processed correctly.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the appended claims. For example, SOAP originally stood for Simple Object Access Protocol, but is now merely a name. In fact, there is a movement to expand the meaning of the acronym to "Service Oriented Architecture Protocol." Therefore, the term SOAP, as used in the specification and the claims, is not limited to Simple Object Access Protocol, but it covers any service oriented protocol. Furthermore, the claimed invention is not limited to XML implementations. Other implementations using similar languages also fall within the scope of the invention.

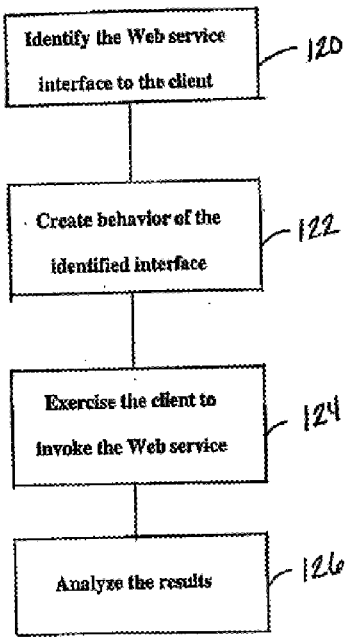

What is claimed is:

1. A method for automatic testing of a web service software including service oriented architecture protocol (SOAP), the method comprising:
   identifying the web service;
   creating one or more test cases for exercising behavior of the identified web service;
   executing the created one or more test cases for obtaining results for the behavior of the identified web service;
   automatically creating graphical user interface (GUI) elements for inputting custom, complex data types; and
   analyzing the results, wherein the web service includes metadata and complex data type, and the step of automatically creating GUI elements comprises creating an internal representation of the metadata for the web service including service name, number of parameters, parameter types, and return type; incorporating the internal representation of the types and values into the generated test case; and generating a GUI representation of the test case.

2. The method of claim 1, wherein the step of identifying comprises identifying a Web Services Description Language (WSDL) related to the web service.

3. The method of claim 1, wherein the step of identifying comprises identifying a metadata related to the web service.

4. The method of claim 1, further comprising modifying the created test cases for future use.

5. The method of claim 1, wherein the step of analyzing comprises validating conformance to specification included in the SOAP.

6. The method of claim 1, wherein the step of analyzing comprises confirming responses to the web service.

7. The method of claim 1, wherein the SOAP is implemented in Extensible Markup Language (XML).

8. The method of claim 7, wherein the step of analyzing comprises validating the XML.

9. The method of claim 7, wherein the step of analyzing comprises identifying complex patterns in the XML.

10. The method of claim 1, wherein the step of analyzing comprises comparing a received response of a test case to an expected response of the test case.

11. The method of claim 1, wherein the step of analyzing comprises determining the response time of the web service description.

12. The method of claim 1, wherein the step of analyzing comprises load testing of the web service.

13. The method of claim 1, wherein the GUI representation includes complex components and primitive components, and the primitive components are based on a mapping of primitive XML types to primitive GUI components.

14. The method of claim 13, wherein the step of mapping comprises:
- breaking the complex components into primitive components including relationships of how the primitive components are composed into the complex components;
- replacing the primitive components with their corresponding primitive GUI elements based on a predefined mapping; and
- composing the GUI elements into a composite GUI element based on the relationships found in the original complex components composition.

15. The method of claim 1, further comprising regression testing of the web service.

16. The method of claim 1, further comprising utilizing the created test cases for load testing.

17. The method of claim 1, further comprising chaining the created test cases for functional testing.

18. The method of claim 1, further comprising creating rules to check whether a response of the service description matches certain general pattern, and enforcing the rules.

* * * * *

UNITED STATES PATENT AND TRADEMARK OFFICE
CERTIFICATE OF CORRECTION

PATENT NO. : 7,028,223 B1
APPLICATION NO. : 10/214209
DATED : April 11, 2006
INVENTOR(S) : Adam Kolawa et al.

It is certified that error appears in the above-identified patent and that said Letters Patent is hereby corrected as shown below:

The Title page should be deleted and substitute therefore the title page as shown on the attached title page.

Drawings:
Delete Drawing Sheet 2 and substitute therefore the Drawing sheet, consisting of Fig. 1B, as shown on the attached page.

On the Title Page

(57) Abstract, line 14        Delete "creates",
                                           Insert --create--

In the Claims

Column 22, line 59, Claim 11      Delete "description".

Column 24, line 9, Claim 18        After "matches",
                                            Insert --a--

Signed and Sealed this

Twenty-eighth Day of November, 2006

JON W. DUDAS
*Director of the United States Patent and Trademark Office*

(12) United States Patent
Kolawa et al.

(10) Patent No.: US 7,028,223 B1
(45) Date of Patent: Apr. 11, 2006

(54) SYSTEM AND METHOD FOR TESTING OF WEB SERVICES

(75) Inventors: Adam Kolawa, Bradbury, CA (US); James Edmond Clune, III, Glendora, CA (US); Wendell T. Hicken, La Verne, CA (US); Luke Li-Ming Chen, Cerritos, CA (US)

(73) Assignee: Parasoft Corporation, Monrovia, CA (US)

( * ) Notice: Subject to any disclaimer, the term of this patent is extended or adjusted under 35 U.S.C. 154(b) by 598 days.

(21) Appl. No.: 10/214,209

(22) Filed: Aug. 7, 2002

Related U.S. Application Data

(60) Provisional application No. 60/312,010, filed on Aug. 13, 2001.

(51) Int. Cl.
*G06F 11/00* (2006.01)
(52) U.S. Cl. .................................. 714/38; 714/37
(58) Field of Classification Search .............. 714/37, 714/38
See application file for complete search history.

(56) References Cited

U.S. PATENT DOCUMENTS

| | | | |
|---|---|---|---|
| 5,490,249 A * | 2/1996 | Miller | 714/38 |
| 5,758,062 A * | 5/1998 | McMahon et al. | 714/38 |
| 6,002,871 A * | 12/1999 | Duggan et al. | 717/135 |
| 6,446,120 B1 * | 9/2002 | Dantressangle | 709/224 |
| 6,505,342 B1 * | 1/2003 | Hartmann et al. | 717/104 |
| 6,622,298 B1 * | 9/2003 | Stamm | 717/125 |
| 6,675,354 B1 * | 1/2004 | Demopoulos et al. | 715/513 |
| 6,823,281 B1 * | 11/2004 | Friedman et al. | 702/119 |
| 2002/0120685 A1 * | 8/2002 | Srivastava et al. | 709/203 |
| 2002/0133752 A1 * | 9/2002 | Hand | 714/38 |
| 2002/0184610 A1 * | 12/2002 | Chong et al. | 717/109 |
| 2003/0033369 A1 * | 2/2003 | Bernhard | 709/203 |
| 2004/0015865 A1 * | 1/2004 | Cirone et al. | 717/124 |

OTHER PUBLICATIONS

Bastide et al., "Formal Specification of CORBA Services: Experience and Lessons Learned.", 2000, ACM.*
Yang et al., "An Object-Oriented Architecture Supporting Web Application Testing", 1999, IEEE.*
Liu et al., "Structural Testing of Web Applications", 2000, IEEE.*

\* cited by examiner

*Primary Examiner*—Scott Baderman
*Assistant Examiner*—Gabriel Chu
(74) *Attorney, Agent, or Firm*—Christie, Parker & Hale, LLP

(57) ABSTRACT

The present invention is a module testing tool for Web services. In one embodiment, the present invention automates the testing of Web services that use SOAP as a wire protocol and HTTP as a transport protocol. The invention provides an easy interface for exercising Web services and testing their functionality. The invention helps users confirm the responses to SOAP messages with such features as fault detection, textual comparisons, XML validation by DTDs or XML Schemas, and the ability to express and flag complex patterns in XML. The invention lets the users validate responses that require application-specific verification (such as business logic validation) by plugging in their own code. It also provides the capability to perform regression testing of web services. The invention can automatically creates regression test controls from SOAP Client responses, or users can create their own regression tests.

18 Claims, 25 Drawing Sheets